United States Patent
Obata

(10) Patent No.: US 9,432,661 B2
(45) Date of Patent: Aug. 30, 2016

(54) ELECTRONIC DEVICE, IMAGE DISPLAY METHOD, AND IMAGE DISPLAY PROGRAM

(75) Inventor: Tooru Obata, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 382 days.

(21) Appl. No.: 14/000,841

(22) PCT Filed: Feb. 24, 2012

(86) PCT No.: PCT/JP2012/054659
§ 371 (c)(1),
(2), (4) Date: Aug. 21, 2013

(87) PCT Pub. No.: WO2012/115253
PCT Pub. Date: Aug. 30, 2012

(65) Prior Publication Data
US 2013/0329014 A1 Dec. 12, 2013

(30) Foreign Application Priority Data

Feb. 24, 2011 (JP) ................................. 2011-039095
Feb. 24, 2011 (JP) ................................. 2011-039102
Feb. 24, 2011 (JP) ................................. 2011-039103

(51) Int. Cl.
*G01B 11/24* (2006.01)
*G01B 11/26* (2006.01)
*G01B 11/00* (2006.01)
*H04N 5/76* (2006.01)
(Continued)

(52) U.S. Cl.
CPC ..... *H04N 13/0468* (2013.01); *H04M 1/72522* (2013.01); *H04N 5/232* (2013.01); *H04N 5/23293* (2013.01); *H04N 13/0203* (2013.01); *H04M 1/7253* (2013.01); *H04M 2250/12* (2013.01); *H04M 2250/52* (2013.01)

(58) Field of Classification Search
CPC .... H04N 13/0468; H04N 5/76; H04N 13/02; H04N 1/393; H04N 5/225; G01B 11/00; G01B 11/24; G01B 11/26; G06F 17/40
See application file for complete search history.

(56) References Cited

U.S. PATENT DOCUMENTS 5,825,997 A 10/1998 Yamada et al.
2008/0297601 A1 12/2008 Okada et al.
(Continued)

FOREIGN PATENT DOCUMENTS

EP 0720392 A2 7/1996
JP 8-186844 A 7/1996
(Continued)

OTHER PUBLICATIONS

Extended European Search Report issued Jun. 10, 2014, corresponds to European patent application No. 12749685.9.
(Continued)

*Primary Examiner* — Sath V Perungavoor
*Assistant Examiner* — Patricia I Young
(74) *Attorney, Agent, or Firm* — Hauptman Ham, LLP

(57) ABSTRACT

According to an aspect, an electronic device includes: an imaging unit for capturing a subject; and a storage unit for storing therein an image captured by the imaging unit. The image stored in the storage unit is an image that forms a three-dimensional image when displayed in combination with other image of the same subject stored in the storage unit.

11 Claims, 28 Drawing Sheets

(51) Int. Cl.
*H04N 13/02* (2006.01)
*H04N 1/393* (2006.01)
*H04N 5/225* (2006.01)
*G06F 17/40* (2006.01)
*G09G 5/00* (2006.01)
*H04N 13/04* (2006.01)
*H04M 1/725* (2006.01)
*H04N 5/232* (2006.01)

(56) References Cited

U.S. PATENT DOCUMENTS

| | | |
|---|---|---|
| 2010/0277617 A1 | 11/2010 | Hollinger |
| 2011/0001800 A1 | 1/2011 | Nagao et al. |

FOREIGN PATENT DOCUMENTS

| | | |
|---|---|---|
| JP | 11-341518 A | 12/1999 |
| JP | 2000-092517 A | 3/2000 |
| JP | 2000-134641 A | 5/2000 |
| JP | 2001108421 A | 4/2001 |
| JP | 200370021 A | 3/2003 |
| JP | 2003-346134 A | 12/2003 |
| JP | 2004-070302 A | 3/2004 |
| JP | 2004-129027 A | 4/2004 |
| JP | 2004-180213 A | 6/2004 |
| JP | 2005-148090 A | 6/2005 |
| JP | 2006-33395 A | 2/2006 |
| JP | 2009-010941 A | 1/2009 |
| JP | 2011-015256 A | 1/2011 |
| JP | 201113121 A | 1/2011 |

OTHER PUBLICATIONS

International Search Report and Written Opinion corresponding to PCT/JP2012/054659, dated May 15, 2012.

Office Action mailed Mar. 10, 2015, corresponding to Japanese patent application No. 2011-039095, for which an explanation of relevance is attached.

Office Action in EP Application No. 12749685.9, dated Mar. 17, 2016.

Paul Beardsley et al., "3D Model Acquisition from Extended Image Sequences" Apr. 15, 1996, Computer Vision ECCV 1996, Springer Berlin Heidelberg, pp. 683-695.

Chen Qian, "Multi-View Image-Based Rendering and Modeling", Dissertation, May 1, 2000, UMI Microform 3017991, Bell & Howell Information and Learning Company.

FIG.4

| FOLDER NAME | FILE NAME | COORDINATE INFORMATION |
|---|---|---|
| BEAR | IMAGE 1 | X=0 Y=1 $\theta$=0° |
| BEAR | IMAGE 2 | X=0.087 Y=0.996 $\theta$=5° |
| BEAR | IMAGE 3 | X=0.173 Y=0.986 $\theta$=10° |
| BEAR | IMAGE 4 | X=0.258 Y=0.965 $\theta$=15° |
| ⋮ | ⋮ | ⋮ |
| PERSON A | IMAGE 1001 | X=0 Y=1 $\theta$=0° |
| ⋮ | ⋮ | ⋮ |

FIG.24

| FOLDER NAME | FILE NAME | COORDINATE INFORMATION |
|---|---|---|
| BEAR | IMAGE 1 | X=0 Y=1 $\theta$=0° |
| BEAR | IMAGE 2 | X=0.087 Y=0.996 $\theta$=5° |
| BEAR | IMAGE 3 | X=0.173 Y=0.986 $\theta$=10° |
| BEAR | IMAGE 4 | X=0.258 Y=0.965 $\theta$=15° |
| ⋮ | ⋮ | ⋮ |
| PERSON A | IMAGE 1001 | X=0 Y=1 $\theta$=0° |
| ⋮ | ⋮ | ⋮ |

ELECTRONIC DEVICE, IMAGE DISPLAY METHOD, AND IMAGE DISPLAY PROGRAM

CROSS-REFERENCE TO RELATED APPLICATION

This application is a National Stage of PCT international application Ser. No. PCT/JP2012/054659 filed on Feb. 24, 2012 which designates the United States, incorporated herein by reference, and which is based upon and claims the benefit of priority from Japanese Patent Application No. 2011-039095, Japanese Patent Application No. 2011-039102, and Japanese Patent Application No. 2011-039103, filed on Feb. 24, 2011.

FIELD

The present disclosure relates to an electronic device, an image display method, and an image display program for capturing images that can be displayed as a three-dimensional image.

BACKGROUND

In recent years, an electronic device for displaying a three-dimensional image has been proposed. A device for capturing a three-dimensional image displayed on the electronic device can capture images reproducible as a three-dimensional image by arranging a mirror and the like and capturing two images at angles displaced from each other (see Patent Literatures 1, 2, and 3). Images reproducible as a three-dimensional image can also be captured by arranging a plurality of imaging devices and simultaneously capturing the images using the respective imaging devices (see Patent Literature 4).

CITATION LIST

Patent Literature

Patent Literature 1: JP-A-2000-92517
Patent Literature 2: JP-A-2000-134641
Patent Literature 3: JP-A-2004-70302
Patent Literature 1: JP-A-11-341518

Technical Problem

The device for capturing a three-dimensional image also includes a device for capturing images reproducible as a three-dimensional image by a user using one electronic device to take a first photo, moving to another place, and then take a second photo. In this way, by acquiring two images while moving to another place, even an electronic device that can capture only one image can capture images reproducible as a three-dimensional image.

However, in a method in which one device is used to capture an image while moving, capture areas may be displaced or distances to a subject may be displaced, and captured images may not therefore form a three-dimensional image, i.e., may not look like a stereoscopic image.

The devices described in Patent Literatures 1 to 3 require an optical system and an imaging element for capturing a three-dimensional image as an imaging mechanism for capturing images. The device described in Patent Literature 4 requires a plurality of imaging devices (imaging equipment). This causes its device configuration to be complicated and increased in size, and the device becomes therefore expensive. Furthermore, for capturing images capable of displaying a three-dimensional image using the imaging devices as described in Patent Literature 4, there remains a problem that complicated adjustment needs to be performed on positions between the imaging devices.

The electronic device for displaying a three-dimensional image can display a three-dimensional image by displaying prepared two images in a superimposed manner. However, a three-dimensional image viewed in one direction can be difficult to recognize a three-dimensional shape of a subject. By acquiring data for the three-dimensional shape of a subject, a three-dimensional image obtained by viewing the subject from various angles can be created; however, the images created from the processed data can be those with a sense of incongruity.

An aspect of the present disclosure has been made to solve the problems, and one of the objects of the aspect is to provide an electronic device capable of appropriately capturing images that can be displayed as a three-dimensional image.

Another aspect of the present disclosure has been made to solve the problems, and one of the objects of the aspect is to provide an electronic device, an image display method, and an image display program capable of appropriately executing at least one of capture and display of a three-dimensional image.

SUMMARY

According to an aspect, an electronic device includes: a housing; an imaging unit provided in the housing for capturing a subject; an angle detecting unit for detecting a relative rotation angle of the subject with respect to the imaging unit; and a storage unit for storing therein an image captured by the imaging unit and the angle of the subject detected, upon capturing the image, by the angle detecting unit. The image stored in the storage unit is an image that forms a three-dimensional image when displayed in combination with other image of the same subject stored in the storage unit.

According to another aspect, the angle detecting unit is configured to analyze the image acquired by the imaging unit, detect a position of an angle specifying portion that relatively rotates together with the subject, and detect thereby the relative rotation angle of the subject.

According to another aspect, the angle detecting unit is configured to analyze the image acquired by the imaging unit, detect a feature point of the subject, and determine the feature point as the angle specifying portion.

According to another aspect, the angle detecting unit includes a shape detecting unit for detecting a shape of the subject, and is configured to detect the rotation angle of the subject based on a change in the shape of the subject detected by the shape detecting unit.

According to another aspect, the angle detecting unit is configured to acquire angle information for a supporting base for supporting the subject, and detect a change in the angle of the subject based on the angle information for the supporting base.

According to another aspect, the storage unit includes a distance calculating unit for calculating a distance between the housing and the subject, and is configured to store therein the distance calculated by the distance calculating unit and the angle detected by the angle detecting unit in association with each other.

According to another aspect, the distance calculating unit is configured to calculate the distance to the subject based on a focal distance detected by the imaging unit.

According to another aspect, the imaging unit is configured to capture the image when the angle detecting unit detects a rotation of the subject.

According to another aspect, the imaging unit continuously captures images.

According to another aspect, the imaging unit is configured to capture the image when it is determined, based on the rotation angle of the subject detected by the angle detecting unit and the rotation angle of the subject associated with an already captured image, that the subject is arranged in a position where an image can be three-dimensionally displayed by being displayed in combination with the already captured image.

According to another aspect, the imaging unit is configured to capture one subject at a plurality of different rotation angles so as to obtain a combination of images capable of three-dimensionally displaying the subject.

According to another aspect, the electronic device further includes: a display unit for displaying a plurality of images in a superimposed manner to display the three-dimensional image; and an operating unit for accepting an operation indicating that the three-dimensional image viewed from which rotation angle is displayed. The display unit is configured to use data for at least the two images to display the subject as the three-dimensional image, based on the operation detected by the operating unit and the angle information associated with the data for the images.

According to another aspect, an electronic device includes: a housing; an operating unit; an imaging unit provided in the housing; a display unit being capable of displaying a plurality of images in a superimposed manner; a storage unit for storing therein an image; an information communication unit for performing communication with other imaging device; and a control unit configured to display a first image captured by the imaging unit and a second image captured by the other imaging device and acquired by the information communication unit on the display unit in a superimposed manner, and store the first image and the second image displayed on the display unit, as images that can be three-dimensionally displayed, in the storage unit in response to an instruction to the operating unit.

According to another aspect, the information communication unit is a short-range communication unit for performing short-range communication.

According to another aspect, the information communication unit is configured to acquire a capture condition of the second image, and the control unit is configured to adjust a capture condition of the imaging unit based on the capture condition of the second image.

According to another aspect, the information communication unit is configured to acquire a capture condition of the second image, and the control unit is configured to compare a capture condition of the first image with a capture condition of the second image, transmit a capture-condition change instruction to the other imaging device through the information communication unit, and cause the other imaging device to change the capture condition thereof.

According to another aspect, the control unit is configured to calculate a distance between the housing and the subject as the capture condition.

According to another aspect, the control unit is configured to detect a relative position to the other imaging device, as the capture condition, based on a communication state with the information communication unit.

According to another aspect, the imaging unit includes a capture-direction adjusting unit for adjusting a direction in which capturing can be performed, and the control unit is configured to analyze the image to determine a position of the subject within the image, and adjust a direction of the imaging unit to a direction in which the subject can be captured.

According to another aspect, an electronic device includes: a housing; an operating unit; an imaging unit provided in the housing; a display unit for displaying a plurality of images in a superimposed manner; a storage unit for storing therein an image; an information communication unit for performing communication with other imaging device; and a control unit configured to perform communication with the other imaging device, in response to an instruction to the operating unit, to adjust a capture condition of the other imaging device and a capture condition of the imaging unit, acquire, after the adjusting, a first image captured by the imaging unit and a second image captured by the other imaging device and acquired by the information communication unit, and store the acquired first image and second image, as images that can be three-dimensionally displayed, in the storage unit.

According to another aspect, the capture condition is at least one of an exposure value, a focal distance, a magnification, and an angle of view.

According to another aspect, an electronic device includes: a housing; an imaging unit provided in the housing for capturing an image; a relative-position acquiring unit for acquiring information on a relative position and angle between the housing and the subject; a control unit configured to acquire the relative position and angle by the relative-position acquiring unit, capture a first image of the subject, and capture a second image of the subject when, based on a result detected by the relative-position acquiring unit, the housing is located at a position and angle where an image capable of stereoscopically viewing the subject by being combined with the first image can be captured; and a storage unit for storing therein the captured images and coordinate information including the relative positions and angles where the images are captured in association with each other.

According to another aspect, the imaging unit includes a capture-direction adjusting unit for adjusting a direction in which capturing can be performed, and the control unit is configured to analyze the image to determine a position of the subject within the image, and adjust a direction of the imaging unit to a direction in which the subject can be captured.

According to another aspect, the control unit is configured to captures one subject at a plurality of different positions and angles so as to obtain a combination of images capable of three-dimensionally displaying the subject.

According to another aspect, the relative-position acquiring unit includes an acceleration sensor for detecting a movement of the housing and a geomagnetic sensor for detecting a direction of the housing.

According to another aspect, the relative-position acquiring unit includes a GPS information acquiring unit for acquiring an absolute position of the housing and a geomagnetic sensor for detecting a direction of the housing.

According to another aspect, the relative-position acquiring unit is configured to calculate a distance between the housing and the subject based on a focal distance detected by the imaging unit.

According to another aspect, an image display method is for an electronic device that includes an operating unit, a display unit for displaying a plurality of images in a superimposed manner to display a three-dimensional image, and a storage unit for storing therein a plurality of images obtained by capturing a subject at different positions together with position information obtained each time the image is captured. The image display method includes: determining a display angle of the subject based on an operation detected by the operating unit; determining at least two image data based on the determined display angle and the position information associated with the image; and superimposing at least the two image data on the display unit to display the subject as a three-dimensional image.

According to another aspect, an image display program causes an electronic device, which includes an operating unit, a display unit for displaying a plurality of images in a superimposed manner to display a three-dimensional image, and a storage unit for storing therein a plurality of images obtained by capturing a subject at different positions together with position information obtained each time the image is captured, to execute: determining a display angle of the subject based on an operation detected by the operating unit; determining at least two image data based on the determined display angle and the position information associated with the image; and superimposing at least the two image data on the display unit to display the subject as a three-dimensional image.

Advantageous Effects of Invention

The electronic device according to one of aspects of the present disclosure can appropriately capture images that can be displayed as a three-dimensional image.

The electronic device, the image display method, and the image display program according to one of aspects of the present disclosure can appropriately execute at least one of capture and display of a three-dimensional image.

BRIEF DESCRIPTION OF DRAWINGS

FIG. 4 is an explanatory diagram illustrating an example of data stored in an image folder.

FIG. 24 is an explanatory diagram illustrating an example of data stored in the image folder.

DESCRIPTION OF EMBODIMENTS

The present disclosure will be explained in detail below with reference to the drawings. It should be noted that the present disclosure is not limited by the following explanation. In addition, the components in the explanation below include those which are easily thought of by persons skilled in the art and those which are substantially equivalents, those substantially identical thereto, and those in a scope of so-called equivalents. In the following, a mobile phone is used for explanation as an example of an electronic device; however, a target to which the present disclosure is applied is not limited to the mobile phones. Therefore, the present disclosure is also applicable to various devices provided with at least one of a three-dimensional (3D) image display function and an image capture function, for example, PHSs (Personal Handy-phone Systems), PDAs, portable navigation devices, personal computers, and gaming devices. When the electronic device has only with the three-dimensional (3D) image display function, the present disclosure can be used not only for to the mobile electronic device but also for various stationary type devices such as TVs and monitors.

Figure 1:
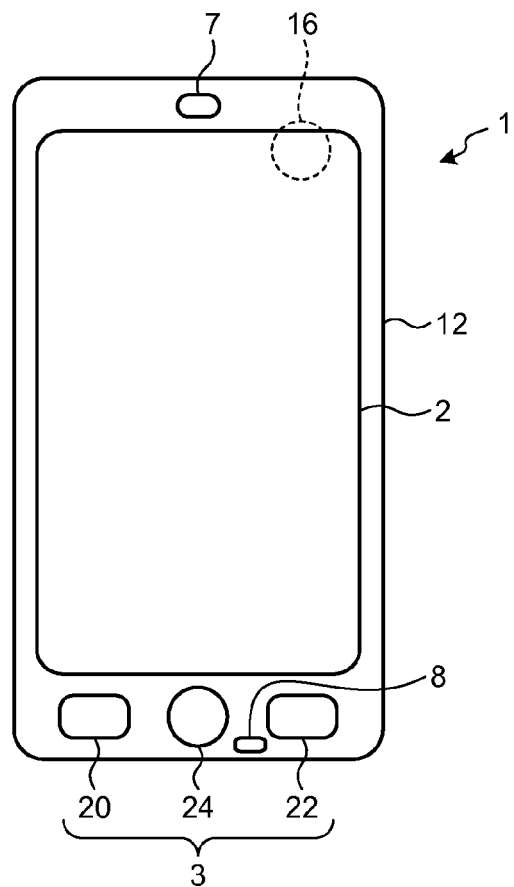
FIG. 1 is a front view illustrating an appearance of a mobile phone.

FIG. 1 is a front view illustrating an appearance of a mobile phone 1 which is an embodiment of a mobile electronic device according to the present disclosure. The mobile phone 1 includes a thin plate-like housing 12. The mobile phone 1 includes a touch panel 2; an input unit 3 including a button 20, a button 22, and an input device 24; a receiver 7; a microphone 8; and a camera 16, which are arranged on the surface of the housing 12. The touch panel 2 is provided over a face with the widest area of the plate-like housing 12. The input unit 3 is also disposed at one end of the face of the housing 12, in its long-side direction, on which the touch panel 2 is provided. The button 20, the input device 24, and the button 22 are arranged in the input unit 3 in this order from one end toward the other end in its short-side direction. The receiver 7 is disposed at the other end of the face of the housing 12, in the long-side direction, on which the touch panel 2 is provided, i.e., at the opposite end to the end where the input unit 3 is disposed. The microphone 8 is disposed at one end of the face of the housing 12, in the long-side direction, on which the touch panel 2 is provided, i.e., at the end where the input unit 3 is disposed. The camera 16 is disposed in a face on the opposite side to the face where the touch panel 2 is provided.

The touch panel 2 displays characters, graphics, images, and the like, and detects any of various operations performed on the touch panel 2 using a finger, a stylus, a pen (a tip of a pen, a tip of a stick-like member) or so (hereinafter, "finger"). For example, in order to accept an input of a character from the user, the mobile phone 1 displays a virtual keyboard on the touch panel 2. The mobile phone 1 detects various operations input to the touch panel 2 with a finger, detects which key of the virtual keyboard is pressed or touched while the virtual keyboard is displayed on the touch panel 2, and determines that the key detected as being pressed or touched is a key used for the input, so that a character input can be performed. The mobile phone 1 detects an input of various operations, as well as the input of the character, based on a displayed image and various motions performed on the touch panel 2 with the finger, and provides various controls based on the input operation.

When the button 20 or 22 is pressed, the input unit 3 activates a function corresponding to the pressed button. The input unit 3 also detects a motion input to the input device 24 as an operation, and performs various controls based on the input operation. For example, the input device 24 detects a direction indication operation and a determination operation. The input device 24 is formed from a touch pad, an optical input device, or an input device that includes buttons in four directions and at a central portion, or the like.

Figure 2:
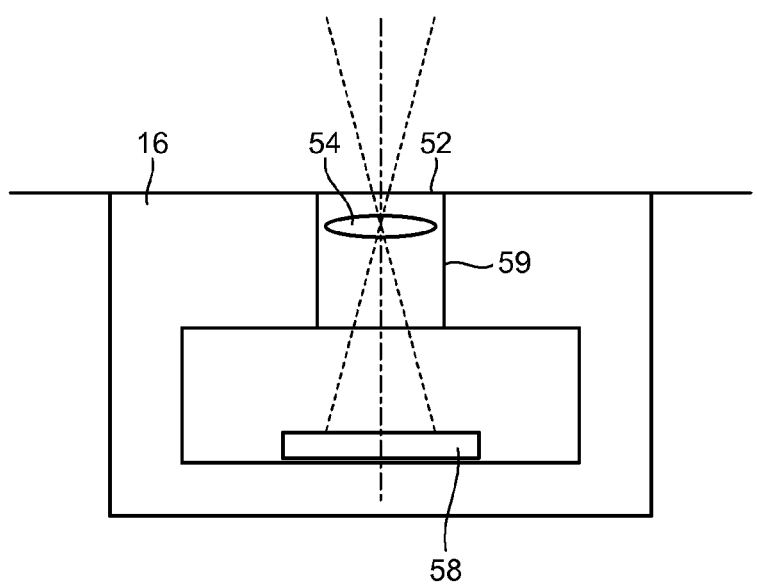
FIG. 2 is an explanatory diagram illustrating a schematic configuration of a camera.

The camera 16 is an imaging device for capturing an image, and includes, as illustrated in FIG. 2, a capture window 52, an optical system 54, an light-receiving unit 58, and a capture-angle adjustment mechanism 59. The capture window 52 is disposed in an exposed manner on the face of the housing 12 opposite to the face where the touch panel 2 is disposed. The capture window 52 is formed of a transparent member, and allows light incident from external light on the housing 12 to enter (to be guided to) the inside thereof. The optical system 54 is formed from an optical member such as a lens for guiding the light incident to the inside of the housing 12 through the capture window 52 to the light-receiving unit 58. The optical system 54 selectively guides the light incident from a predetermined angle range (capture area), of the light incident through the capture window 52, to the light-receiving unit 58. The light-receiving unit 58 is a device for acquiring image information for the capture area, and includes an imaging element (CMOS image sensor, CCD image sensor, etc.) with photodiodes arranged in a matrix on its light-receiving surface. When an image is formed on the light-receiving surface, the light-receiving unit 58 reads the formed image by the imaging element and converts the read image into image information being electronic data. The capture-angle adjustment mechanism 59 adjusts an angle of the optical system 54 to adjust a range of the light that is incident through the capture window 52 and made incident on the light-receiving unit 58. That is, the capture-angle adjustment mechanism 59 adjusts an optical axis. The capture-angle adjustment mechanism 59 is formed from a mechanism for adjusting a position of at least one lens of the optical system 54, a mechanism for adjusting the overall direction of the optical system 54, or the like. The capture-angle adjustment mechanism 59 moves the position of the light-receiving unit 58 in accordance with movement of the capture area. The capture-angle adjustment mechanism 59 may also be configured to enable performance of a camera shake correction process.

The camera 16 is configured in the above manner, and acquires an image of the capture area by guiding the light of the capture area, which is incident from the capture window 52, to the light-receiving unit 58 through the optical system 54 and reading the light as the image formed on the light-receiving unit 58. The camera 16 can also adjust an angle of the capture area using the capture-angle adjustment mechanism 59. The camera 16 also includes an auto-focus function and a zoom function in addition to these functions.

Figure 3:
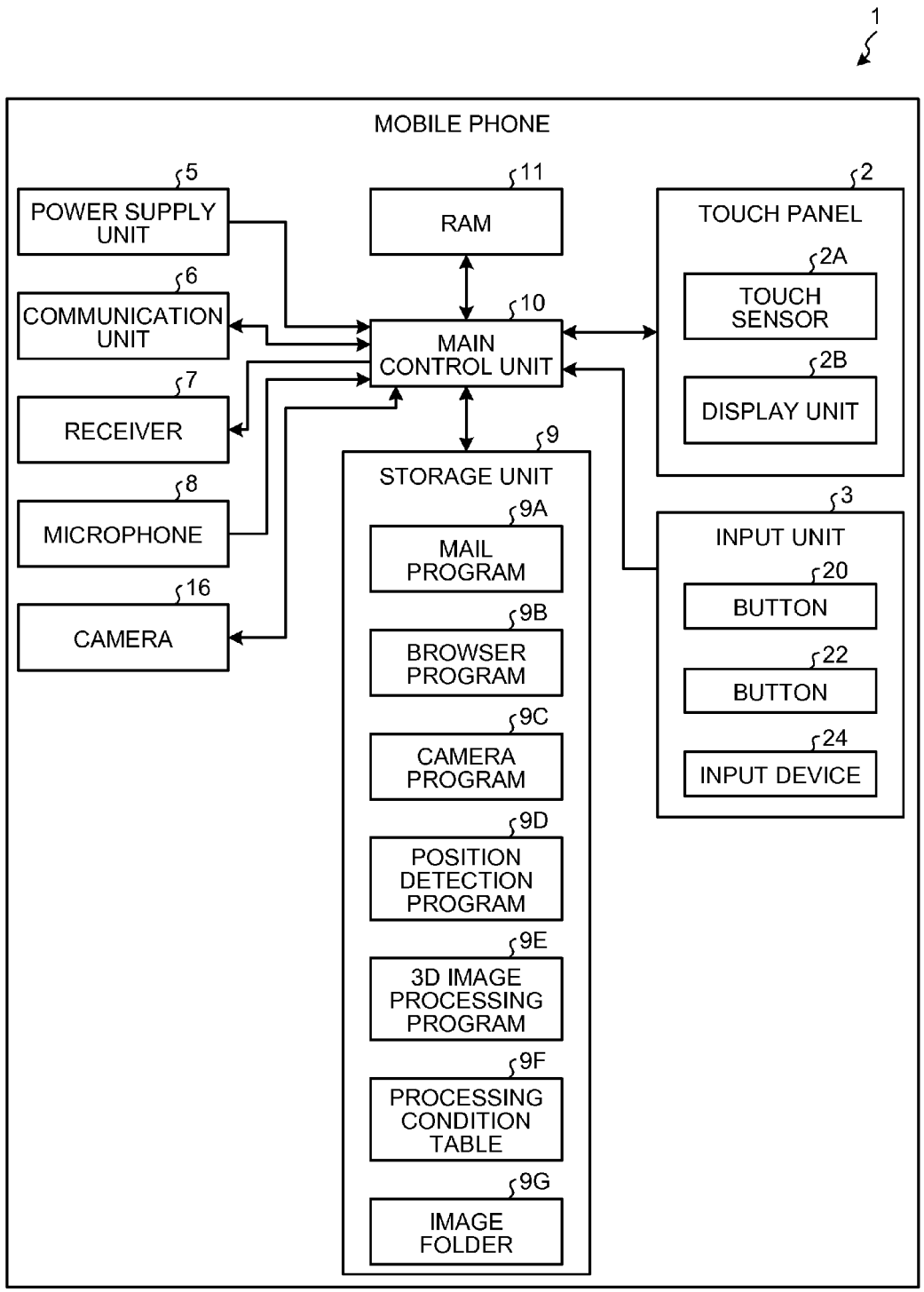
FIG. 3 is a block diagram illustrating a schematic configuration of functions of the mobile phone.

Then a relation between the functions and the control unit of the mobile phone 1 will be explained below. FIG. 3 is a block diagram illustrating a schematic configuration of the functions of the mobile phone 1 illustrated in FIG. 1. As illustrated in FIG. 3, the mobile phone 1 includes the touch panel 2, the input unit 3, a power supply unit 5, a communication unit 6, the receiver 7, the microphone 8, a storage unit 9, a main control unit 10, RAM (Random Access Memory) 11, and the camera 16. In the present embodiment, a function for analyzing, by the main control unit 10, an image captured by the camera 16 (a function implemented by a position detection program 9D explained later) forms an angle detecting unit for detecting an angle of a subject (a relative rotation angle of a subject 60 with respect to the camera 16). A function for analyzing, by the main control unit 10, a focal distance detected by the camera 16 (the function implemented by the position detection program 9D explained later) forms a distance calculating unit for detecting a distance between the mobile phone 1 (housing 12) and the subject.

The touch panel 2 includes a display unit 2B and a touch sensor 2A placed over the display unit 2B. The touch sensor 2A detects various operations performed on the touch panel 2 using a finger together with positions on the touch panel 2 where the operations are performed. The operations detected by the touch sensor 2A include an operation of bringing a finger into contact with the surface of the touch panel 2, an operation of moving a finger while keeping the finger in contact with the surface of the touch panel 2, and an operation of removing a finger from the surface of the touch panel 2. Any one of detection methods such as a pressure sensitive type and a capacitive type may be used as the detection method of the touch sensor 2A. The display unit 2B is formed with, for example, an LCD (Liquid Crystal Display) or an OEL (Organic Electro-Luminescence) panel, and displays text, graphics, images, and so on. The display unit 2B can display a three-dimensional (3D) image by displaying a plurality of images in a superimposed manner, i.e., images that the user can view stereoscopically. In other words, the display unit 2B can display a three-dimensional (3D) image by displaying a plurality of images in a superimposed manner.

As explained above, the input unit 3 includes the buttons 20, 22, and the input device 24. The buttons 20 and 22 accept a user operation through a physical input (depression) and transmit a signal corresponding to the accepted operation to the main control unit 10. The input device 24 also accepts a user operation and transmits a signal corresponding to the accepted operation to the main control unit 10.

The power supply unit 5 supplies electric power obtained from a battery or an external power supply to each of function units of the mobile phone 1 including the main control unit 10. The communication unit 6 establishes a wireless signal path using a CDMA system or so with a base station via a channel allocated by the base station, and performs telephone communication and information communication with the base station. The receiver 7 outputs the voice of the other party on the telephone communication, a ring tone, and the like. The microphone 8 converts the voice of the user or so to electrical signals.

The storage unit 9 is, for example, a nonvolatile memory or a magnetic storage device, and stores therein programs and data used for processes performed by the main control unit 10. Specifically, the storage unit 9 stores therein a mail program 9A for transmitting, receiving, and browsing mail, a browser program 9B for browsing Web pages, a camera program 9C for capturing an image using the camera 16, the position detection program 9D for detecting a position of the mobile phone 1 or a relative position between the mobile phone 1 and a subject based on analysis results of images captured by the camera 16, a 3D (three-dimensional) image processing program 9E for capturing images that can be displayed as a 3D (three-dimensional) image and displaying the 3D image, a processing condition table 9F associated with various conditions used for executing the various programs, and an image folder 9G storing therein images acquired through capturing or the like. The storage unit 9 also stores therein an operating system program for performing basic functions of the mobile phone 1, and other programs and data such as address book data in which names, telephone numbers, mail addresses, and the like are registered. The storage unit 9 further stores therein programs for determining control operations and processes based on an input operation input to the touch panel 2. The control operations and processes include various operations and processes performed by the mobile phone 1, which are, for example, a movement of a cursor and a pointer, a change of screen display, a character input process, and an activation process and an end process of various applications.

FIG. 4 is an explanatory diagram illustrating an example of data stored in an image folder. As illustrated in FIG. 4, a plurality of pieces of image data are stored in the image folder 9G, in which a folder name, a file name, and coordinate information are associated with each of the image data. Image data obtained by capturing the same subject are associated with each other using the same folder name and are stored in the image folder 9G. The coordinate information is information on a relative position between a subject and a capture position, and pieces of the image data associated with the same folder are associated with the coordinate information calculated by using the same axes.

The main control unit 10 is, for example, a CPU (Central Processing Unit), and integrally controls the operations of the mobile phone 1. Specifically, the main control unit 10 executes the programs stored in the storage unit 9 while referring to the data stored in the storage unit 9 as necessary to execute the various processes by controlling the touch panel 2, the input unit 3, the communication unit 6, the camera 16, and the like. The main control unit 10 loads the programs stored in the storage unit 9 and data, which is acquired, generated, or processed by executing the processes, to RAM 11 providing a temporary storage area as necessary. The programs to be executed and the data to be referred to by the main control unit 10 may be downloaded from a server through wireless communication by the communication unit 6.

As explained above, the camera 16 is an imaging mechanism that includes the capture window 52 used to capture an image and exposed from the housing 12, and that acquires an image of the capture area.

Figure 5:
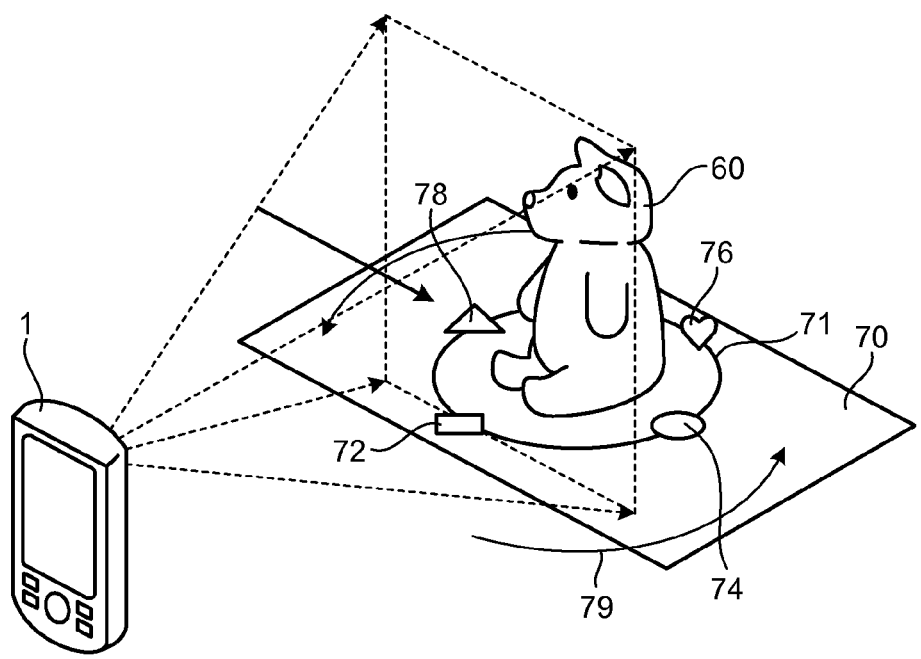
FIG. 5 is an explanatory diagram for explaining a capture operation of the mobile phone.
Figure 6:
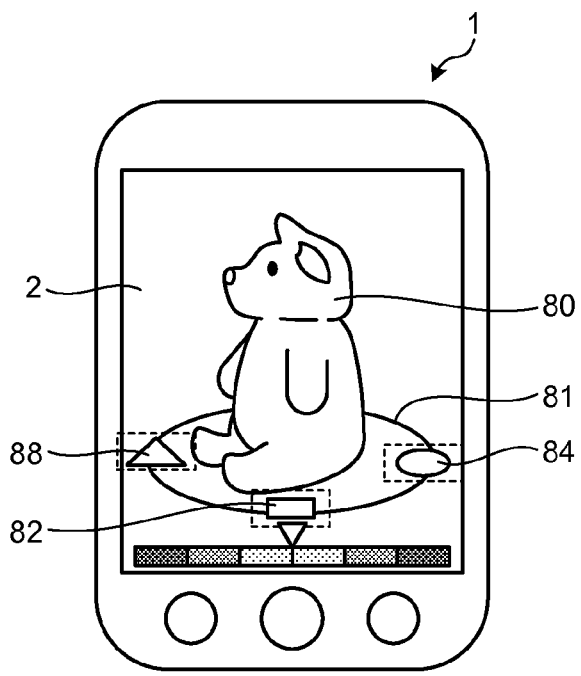
FIG. 6 is an explanatory diagram illustrating an example of a screen displayed during the capture operation of the mobile phone.
Figure 7:
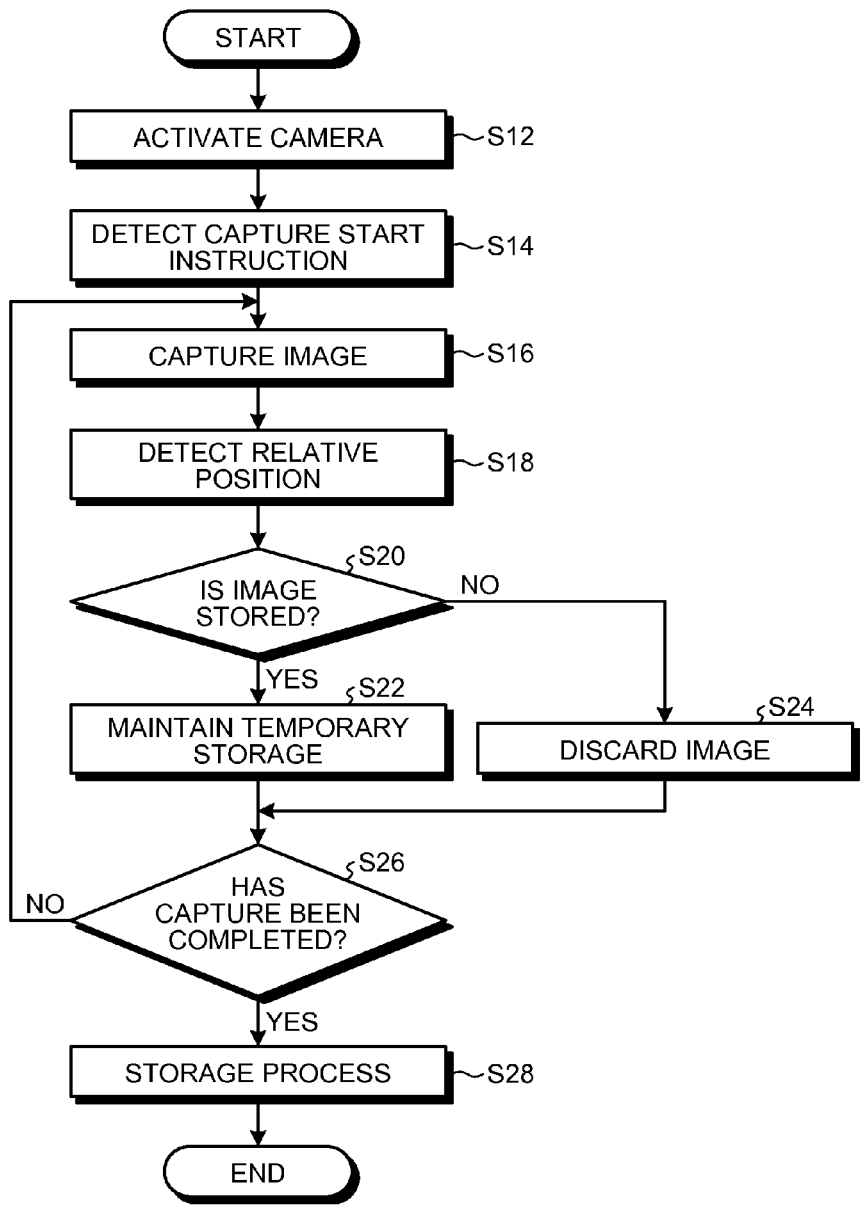
FIG. 7 is a flowchart illustrating an example of processes during the capture operation of the mobile phone.

Then an example of a capture operation (the capture operation for capturing images that can be displayed as a three-dimensional image) will be explained below with reference to FIG. 5 to FIG. 7. FIG. 5 is an explanatory diagram for explaining a capture operation of the mobile phone 1. FIG. 6 is an explanatory diagram illustrating an example of a screen displayed during the capture operation of the mobile phone 1.

As illustrated in FIG. 5, the subject 60 as a target to be captured by the mobile phone 1 is placed on a supporting base 70. The supporting base 70 is a rotatable member. In the present embodiment, a thin plate-like member such as paper and a thin plate is used; however, a turntable rotatably supported by a base may be used. The supporting base 70 has a circle 71 formed centering on the subject 60 around the portion of the subject 60 and has marks 72, 74, 76, and 78 spaced at intervals of 90 degrees on the circle 71. In other words, the subject 60 is placed at the center of the circle 71 of the supporting base 70. If the position of the mark 72 is set as a position of 0 degrees and forms an angle with another position in a direction of arrow 79, then the mark 74 is located at a position of 90 degrees, the mark 76 is located at a position of 180 degrees, and the mark 78 is located at a position of 270 degrees. The mark 72 has a rectangular shape, the mark 74 has a circular shape, the mark 76 has a heart shape, and the mark 78 has a triangular shape. The marks 72, 74, 76, and 78 may be printed on the supporting base 70 or the like, or may be removably provided thereon. The circle 71 and the marks 72, 74, 76, and 78 are fixed to the supporting base 70 and are moved together with the supporting base 70. The subject 60 is also rotated together with the supporting base 70.

When the mobile phone 1 captures an image in the state illustrated in FIG. 5 from a direction at an angle of 0 degrees, the captured image is displayed on the touch panel 2 as illustrated in FIG. 6. The captured image herein includes an image 80 of the subject 60, an image 81 of the circle 71, an image 82 of the mark 72, an image 84 of the mark 74, and an image 88 of the mark 78. The mobile phone 1 analyzes each positional relation between the image 82 of the mark 72, the image 84 of the mark 74, and the image 88 of the mark 78 which are included in the captured image, and can thereby detect an angle of the subject 60. The angle of the subject is a rotation angle (a variation of an angle) from an arbitrary position set as a reference position, and is a relative rotation angle of the subject 60 with respect to the camera 16.

The mobile phone 1 detects the positions of the marks arranged on the supporting base 70 on which the subject 60 is placed and which rotates together with the subject 60 in the above manner, to thereby enable detection of an angle of the subject 60. The mobile phone 1 uses the focal distance detected by the camera 16 upon image capture to enable calculation of a distance between the mobile phone 1 (housing 12) and the subject 60. The mobile phone 1 uses the angle of the subject 60 and the distance between the mobile phone 1 (housing 12) and the subject 60 calculated in the above manner to thereby enable calculation of a relative positional relation (coordinate information) between the mobile phone 1 (housing 12) and the subject 60 including a relative rotation angle of the subject 60 with respect to the camera 16.

Then a processing operation of the mobile phone 1 will be explained below with reference to FIG. 7. FIG. 7 is a flowchart illustrating an example of processes during the capture operation of the mobile phone 1. The processes illustrated in FIG. 7 are an example of the capture operation of the mobile phone 1 for capturing images that can be displayed as a three-dimensional image. The processing procedure illustrated in FIG. 7 is executed based on the functions provided by the camera program 9C, the position detection program 9D, and the 3D image processing program 9E. More specifically, the mobile phone 1 analyzes various detection results and images acquired by a function (image capture function) provided by the camera program 9C and by a function (position detection function) provided by the position detection program 9D based on a function provided by the 3D image processing program 9E, and controls the operation of the function (capture function) provided by the camera program 9C to capture the subject. When an instruction to activate the function of capturing a three-dimensional image is received, the mobile phone 1 performs the processes illustrated in FIG. 7.

The mobile phone 1 activates the camera 16 at Step S12. When the camera 16 is activated at Step S12, then at Step S14, the mobile phone 1 detects a capture start instruction. Specifically, the mobile phone 1 detects a pressure of a capture start instruction (shutter) or the like from the user.

When detecting a capture start instruction at Step S14, then at Step S16, the mobile phone 1 captures an image, i.e., acquires an image. The mobile phone 1 temporarily stores data for the acquired image in the RAM 11, the storage unit 9, or the like. When the image is acquired at Step S16, then at Step S18, the mobile phone 1 acquires relative position information i.e. coordinate information. Specifically, the mobile phone 1 analyzes the acquired image, extracts marks included in the image, detects an angle of the subject using the positions of the marks, further detects a distance between the mobile phone 1 (housing 12) and the subject using a focus function of the camera 16, and acquires information of a relative positional relation (relative position). The mobile phone 1 sets an initially detected relative position as a reference for a relative position. The mobile phone 1 temporarily stores the acquired capture position information.

When the relative position information (coordinate information) is acquired at Step S18, then at Step S20, the mobile phone 1 determines whether to store the captured image. As for criteria as to whether the captured image is to be stored, various settings can be made. For example, a case, in which the coordinates indicate that a stereoscopic image of the subject can be displayed by combining the captured image with the image that has already been captured and stored, may be set to determine that the captured image is stored. A case, in which the angle of the subject in the coordinate information is a preset angle, may be set to determine that the captured image is stored. A case, in which the angle of the subject in the coordinate information is changed from the angle of the subject as the previously stored image, may be set to determine that the captured image is stored.

When it is determined that the image is stored at Step S20 (Yes), then at Step S22, the mobile phone 1 maintains a temporal storage. That is, the mobile phone 1 holds the acquire image data and the coordinate information corresponding thereto as they are. When it is determined that the image is not stored at Step S20 (No), then at Step S24, the mobile phone 1 discards the image data. That is, the mobile phone 1 discards the image data as an object to be determined and the coordinate information corresponding thereto.

When the process at Step S22 or Step S24 is performed, then at Step S26, the mobile phone 1 determines whether the capture has been completed. As for criteria as to whether the capture has been completed, various settings can be made. For example, a case, in which the subject is rotated by a set angle, may be set to determine that the capture has been completed, and a case, in which it is detected that an end instruction has been input by the user, may be set to determine that the capture has been completed.

When it is determined that the capture has not been completed at Step S26 (No), the mobile phone 1 proceeds to Step S16 and repeats the processes. When it is determined that the capture has been completed at Step S26 (Yes), then at Step S28, the mobile phone 1 performs a storage process. Specifically, the mobile phone 1 stores the captured image(s) and the position information in the image folder 9G of the storage unit 9 in association with each other. It maybe configured such that the mobile phone 1 displays the captured image and an inquiry screen as to whether to store the captured image on the touch panel 2, and when detecting a storage instruction from the user, then the mobile phone 1 store the image. After the storage process at Step S28, the mobile phone 1 ends the present process.

In this way, the mobile phone 1 detects a rotation angle of the subject and detects a relative position between the mobile phone 1 (housing 12, mobile phone 1) and the subject 60, and can thereby detect, with high precision, a relative positional relation (especially, a relative rotation angle of the subject 60 with respect to the camera 16) between a plurality of images obtained by capturing the subject 60 (the same subject). Thus, images at positions where a three-dimensional image of the subject can be captured can be more appropriately acquired. In other words, because the relative positional relation between two combined images is clearer, a combination of images that forms a more appropriate three-dimensional image when displayed in a superimposed manner can be captured. In addition, a combination of image data capable of being three-dimensionally displayed can be captured by a single unit of mobile phone 1.

The mobile phone 1 can also store the coordinate information (relative position information between the subject and the capture position) between pieces of the two image data. This makes the relation between the images used for a three-dimensional display clear, so that the three-dimensional image can be appropriately displayed. Moreover, because a relative position between the images is known, selection of images to be used for display as a three-dimensional image and adjustment of a display mode can be automatically performed. In other words, the mobile phone 1 can acquire an image unit (a plurality of pieces of image data and corresponding coordinate information) which is easy to be used by a device for displaying a three-dimensional image.

In the mobile phone 1, the number of three-dimensional images that are acquired by capturing and can be displayed is not particularly limited. Images may be captured in order to display one three-dimensional image or images may be captured so that a plurality of three-dimensional images can be displayed. By capturing images so that a plurality of three-dimensional images can be displayed, images capable of displaying a three-dimensional image when one subject is viewed from a plurality of angles can be captured.

When continuously capturing images and further associating the image data with the coordinate information (relative position), the mobile phone 1 can thereby capture a plurality of images in which the subject is captured at different angles. This enables to capture image data capable of displaying three-dimensional images when one subject is viewed from different angles. The relative position information is stored in association with each of the image data, and this enables to create three-dimensional images by combining appropriate images at respective angles in relative positions.

When continuously capturing images in association with a rotation of the subject, the mobile phone 1 can thereby capture a combination of image data capable of displaying a three-dimensional image of the subject in any direction of the whole circumference (360 degrees).

In the embodiment, images are captured as still images, but images may be captured as moving images. In other words, images of all acquired frames may be stored. In this case, each of the frames of the images as the captured moving images is stored in association with respective relative position information. By thus storing all the acquired frames, a three-dimensional image can be displayed in more combinations of the images, which enables display of three-dimensional images at more precise angles.

How to capture images is not particularly limited. For example, when a first image is captured by a user's shutter operation and, thereafter, when an image at a capture position where a three-dimensional image of the subject can be displayed by being combined with the first image is acquired, then the image may be stored as a second image. In other words, it may be configured that capture of a first image is triggered by a user instruction and that a second image corresponding to the first image is automatically captured and stored.

Without capturing an image combination in which two images are used to display one three-dimensional image, the mobile phone 1 may capture an image combination in which more images are used to display one three-dimensional image. In this case, the mobile phone 1 captures an image at a required relative position by corresponding pieces, to thereby enable capture of a three-dimensional image formed from a plurality of pieces of image data.

The mobile phone 1 preferably corrects images. Specifically, the mobile phone 1 compares the captured image with other image to be combined with the captured image to display a three-dimensional image, cuts off surrounding scenery or the like included only in either one of the images, and thus makes the subjects, sceneries, and the like included in the two images have the same structures as each other. This enables to suppress the sense of incongruity caused by displaying a combination of the two images.

Figure 8:
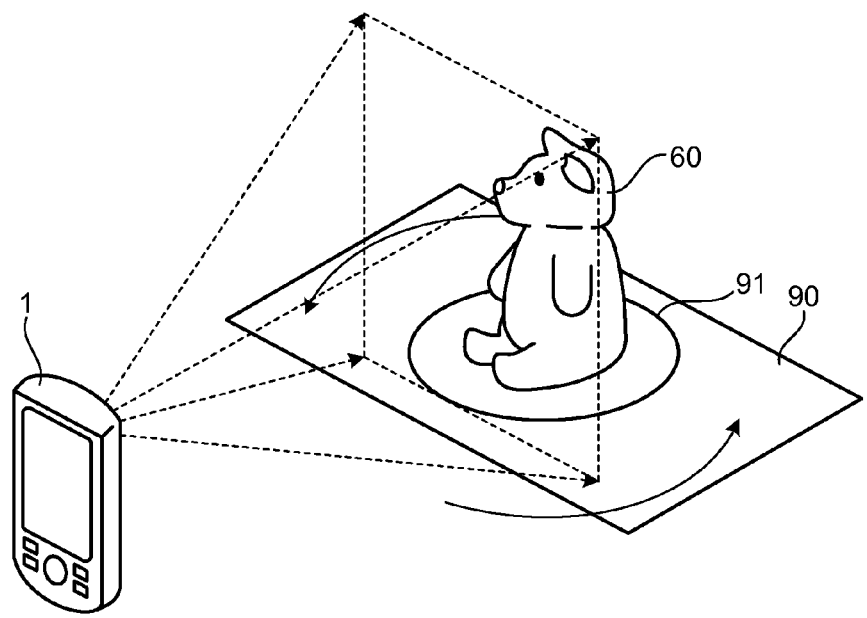
FIG. 8 is an explanatory diagram for explaining a capture operation of the mobile phone.
Figure 9:
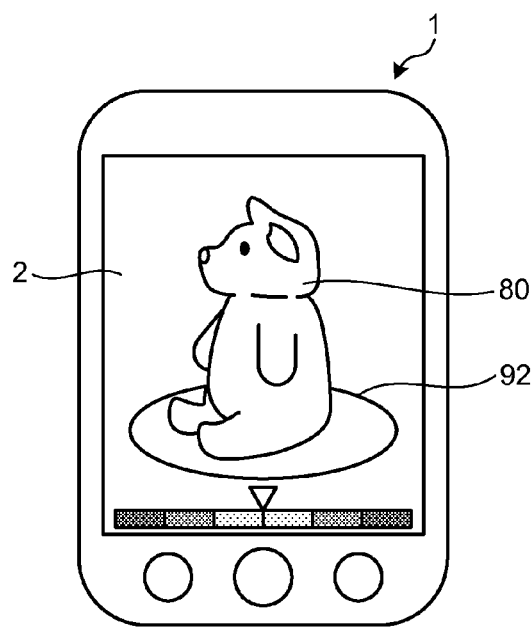
FIG. 9 is an explanatory diagram illustrating an example of a screen displayed during the capture operation of the mobile phone.

Modifications of a capture operation will be explained below with reference to FIG. 8 to FIG. 11. FIG. 8 is an explanatory diagram for explaining a capture operation of the mobile phone 1. FIG. 9 is an explanatory diagram illustrating an example of a screen displayed during the capture operation of the mobile phone 1. A detection method of relative information, specifically, a detection method of a rotation angle of a subject is not limited to the embodiment, and therefore various methods can be used.

As illustrated in FIG. 8, the subject 60 as a target to be captured by the mobile phone 1 is placed on a supporting base 90. The supporting base 90 is a rotatable member. The supporting base 90 according to the present modification has no marks formed thereon except for a circle 91 that is used as a reference of a position where the subject 60 is placed. The circle 91 is a circumferentially uniform shape. The subject 60 rotates together with the supporting base 90.

When the mobile phone 1 captures an image in the state illustrated in FIG. 8, the captured image is displayed on the touch panel 2 as illustrated in FIG. 9. The captured image herein includes the image 80 of the subject 60 and an image 92 of the circle 91. The mobile phone 1 analyzes the image 80 of the subject 60 included in the captured image to thereby detect a feature point of the subject 60. Here the mobile phone 1 detects a plurality of feature points of the subject 60.

In this way, the mobile phone 1 can detect an angle of the subject 60 also by detecting the feature points of the subject 60 and detecting a change in a positional relation between feature points. More specifically, the mobile phone 1 compares the captured image with the previously captured image to detect a change in positions of the feature points, and can thereby detect a change in a relative position and detect a change in the angle of the subject 60. The mobile phone 1 detects a change in the angle each time the image is acquired and adds up the detected values to thereby enable calculation of a relative rotation angle (change in angle, relative position) of the subject 60 from the reference position.

The mobile phone 1 can calculate a relative positional relation between the mobile phone 1 (housing 12) and the subject 60 also by using the angle of the subject 60 calculated in the above manner and the distance between itself (housing 12) and the subject 60. As illustrated in FIG. 8 and FIG. 9, by using the feature points of the subject, the angle of the subject 60 can be detected even if the marks are not provided as is in the embodiment.

Figure 10:
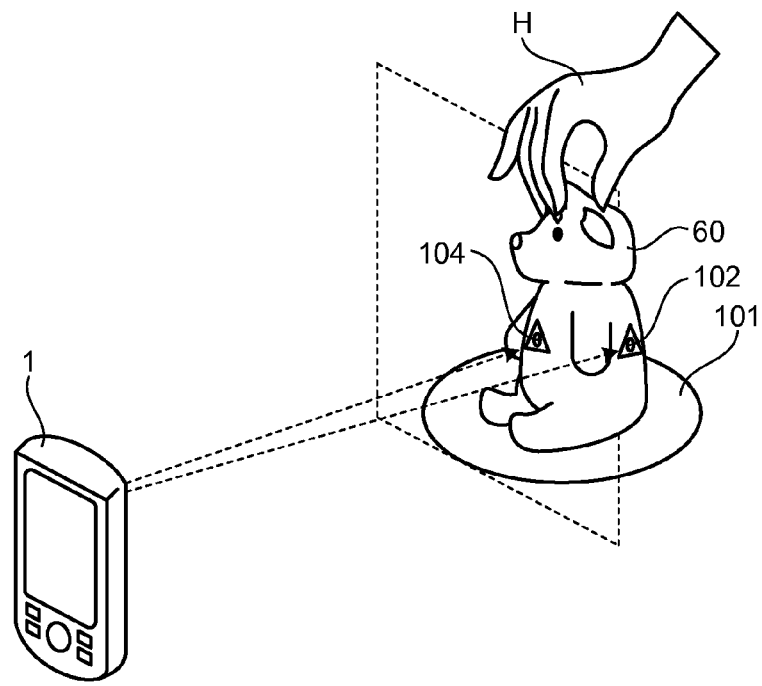
FIG. 10 is an explanatory diagram for explaining a capture operation of the mobile phone.
Figure 11:
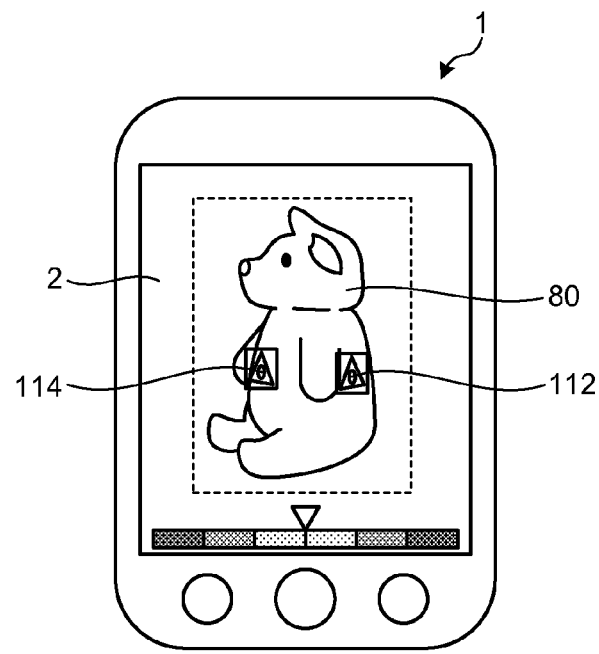
FIG. 11 is an explanatory diagram illustrating an example of a screen displayed during the capture operation of the mobile phone.

FIG. 10 is an explanatory diagram for explaining a capture operation of the mobile phone 1. FIG. 11 is an explanatory diagram illustrating an example of a screen displayed during the capture operation of the mobile phone 1. As illustrated in FIG. 10, the subject 60 as a target to be captured by the mobile phone 1 is placed on a supporting base 101. Marks 102 and 104 are provided on the subject 60. The marks 102 and 104 are fixed to different positions of the subject 60. In the example of FIG. 10, the subject 60 is rotated by a user's hand H.

When the mobile phone 1 captures an image in the state illustrated in FIG. 10, the captured image is displayed on the touch panel 2 as illustrated in FIG. 11. The captured image herein includes the image 80 of the subject 60, an image 112 of the mark 102, and an image 114 of the mark 104. The mobile phone 1 analyzes a relative position between the image 112 of the mark 102 and the image 114 of the mark 104 included in the captured image to thereby enable detection of an angle of the subject. The angle of the subject is a rotation angle (a variation of an angle) from an arbitrary position set as a reference position.

The mobile phone 1 detects the positions of the marks provided on the subject 60 in this way to thereby enable detection of an angle of the subject 60. The mobile phone 1 uses the angle of the subject 60 calculated in the above manner and the distance between the mobile phone 1 (housing 12) and the subject 60 to thereby enable calculation of a relative positional relation (coordinate information) between the mobile phone 1 (housing 12) and the subject 60.

In this way, by providing the marks as indications on the subject 60, a positional relation between the marks is detected to thereby enable detection of an angle of the subject without rotating the supporting base 101 together with the subject 60. Moreover, by providing the marks on the subject 60, the angle of the subject 60 can be more accurately detected because the marks are more distinct than the feature points.

As the mark, a simple sign, a two-dimensional barcode, an image (image reflective to infrared rays) invisible to the naked eye, and the like can be used. The mobile phone 1 preferably deletes the images of the marks from the captured image through image processing. Thus, any image other than the subject can be prevented from being included in the captured image, and this enables creation of images capable of more appropriately displaying a three-dimensional image of the subject.

In the embodiment, because the device configuration becomes simple, the mechanism for analyzing the captured image and detecting an angle of the subject is used as an angle detecting unit for detecting an angle with the subject (a relative angle between the mobile phone 1 and the subject); however, the embodiment is not limited thereto. As the angle detecting unit, a sensor for detecting a three-dimensional image of the subject e.g. a TOF (Time-of-Flight) sensor can be used. The mobile phone 1 can also calculate an angle of the subject by calculating a three-dimensional shape of the subject and calculating a change in the three-dimensional shape. Moreover, when the subject and the supporting base are configured to integrally rotate, the angle detecting unit can also detect an angle of the subject by acquiring angle information of the supporting base through communication or the like.

The mobile phone 1 preferably adjusts a capture area according to the position of the subject. Thus, even if the direction of the housing 12 changes and the relative position is shifted, an image in which the subject is located at the center of the image can be captured. This enables to prevent the subject from not being included in the image and a three-dimensional image of the subject from not being created.

Even if the capture area of the camera 16 is mechanically adjusted, the mobile phone 1 may be configured to previously set only part of the capture area as an acquisition area of the image i.e. to acquire a trimmed image, and to change a position where the image is trimmed according to the movement of the relative position.

It is preferable that the mobile phone 1 executes the processes of the camera program 9C by the main control unit 10 to control capture conditions such as focal distance, magnification (zoom), and exposure and to set the brightness, the size, and the like of subjects in the captured images to be equal to each other. This enables to suppress the sense of incongruity caused by superimposing the images in order to display a three-dimensional image.

Figure 12:
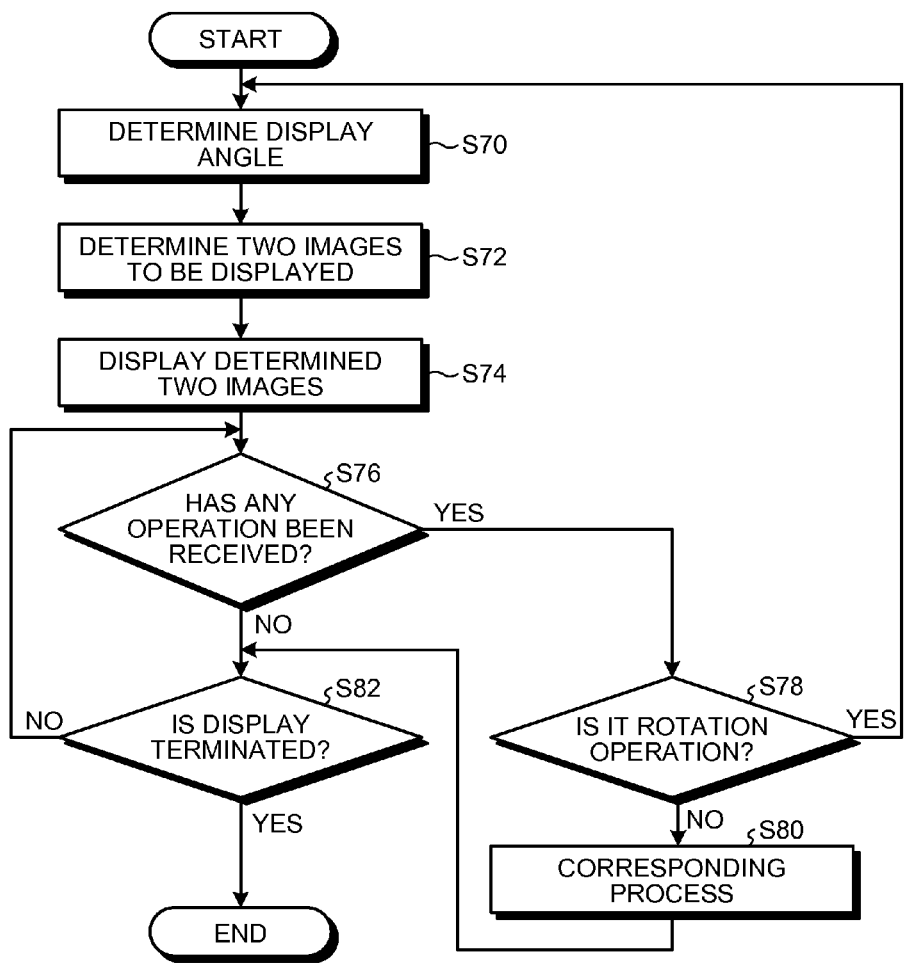
FIG. 12 is a flowchart illustrating an example of processes during a display operation of the mobile phone.
Figure 13:
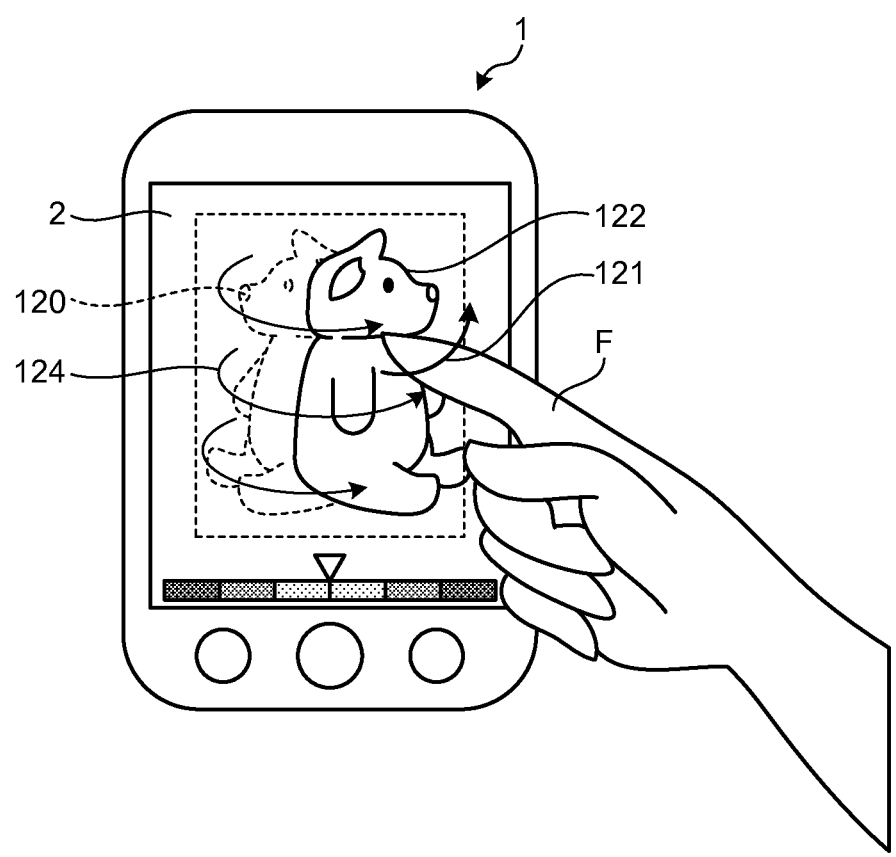
FIG. 13 is an explanatory diagram for explaining the display operation of the mobile phone.

Then an example of operations for three-dimensionally displaying the captured image will be explained below with reference to FIG. 12 and FIG. 13. FIG. 12 is a flowchart illustrating an example of processes during a display operation of the mobile phone 1. FIG. 13 is an explanatory diagram for explaining the display operation of the mobile phone 1. The processes illustrated in FIG. 12 are an example of the display operation of the mobile phone 1 for displaying a three-dimensional image. The processing procedure illustrated in FIG. 12 is executed based on the function provided by the 3D image processing program 9E.

First of all, when an instruction to display a three-dimensional image is input and a subject (image folder) as a target to be displayed is specified, the mobile phone 1 determines a display angle at Step S70. That is, the mobile phone 1 determines a display angle of a subject as a display target. The display angle is determined based on a user operation or preset conditions.

When the display angle is determined at Step S70, then at Step S72, the mobile phone 1 determines two images to be displayed. That is, the mobile phone 1 determines a combination of images capable of displaying a three-dimensional image of the subject based on coordinate information (information for a relative position) stored with the determined display angle in the image folder 9G. When two images are determined at Step S72, then at Step S74, the mobile phone 1 displays the determined two images on the touch panel 2. Specifically, the two images are displayed in a superimposed manner to display a three-dimensional image of the subject.

When the three-dimensional image is displayed at Step S74, then at Step S76, the mobile phone 1 determines whether any operation has been received. When it is determined that the operation has been received at Step S76 (Yes), then at Step S78, the mobile phone 1 determines whether the operation is a rotation operation. That is, the mobile phone 1 determines whether it is an operation of changing the display angle of the subject.

When it is determined that the operation is a rotation operation at Step S78 (Yes), the mobile phone 1 proceeds to Step S70. In this way, when the operation of changing the display angle is received, the mobile phone 1 again determines a display angle based on the operation and displays a three-dimensional image of the subject at the determined angle.

When it is determined that it is not a rotation operation at Step S78 (No), then at Step S80, the mobile phone 1 performs a corresponding process. That is, the mobile phone 1 executes a process corresponding to the received operation. After the performance of the process at Step S80, the mobile phone 1 proceeds to Step S82.

When it is determined that no operation has been received at Step S76 (No) or when the process at Step S80 is performed, then at Step S82, the mobile phone 1 determines whether the display is terminated. That is, the mobile phone 1 determines whether the display of the three-dimensional image is terminated. When it is determined that the display is not terminated at Step S82 (No), the mobile phone 1 proceeds to Step S76, again determines whether the operation has been received, and repeats the processes. When it is determined that the display is terminated at Step S82 (Yes), then the mobile phone 1 terminates the display of the three-dimensional image and ends the present process.

A specific example will be explained below with reference to FIG. 13. As illustrated in FIG. 13, when an operation indicated by an arrow 121 is input with a finger F while displaying a three-dimensional image 120 representing the subject at predetermined angles on the touch panel 2, the mobile phone 1 determines that an operation of rotating the subject has been input. The mobile phone 1 calculates an amount of rotation of the subject based on the operation input with the finger F and determines an angle at which the subject is displayed. Thereafter, the mobile phone 1 determines a combination of images capable of displaying a three-dimensional image at the determined angle, and displays the determined combination of images on the touch panel 2. This allows the mobile phone 1 to display a three-dimensional image 122, on the touch panel 2, in a state in which the subject has been rotated by a given angle from the three-dimensional image 120 in a direction of an arrow 124.

In this way, the mobile phone 1 stores therein a plurality pieces of image data obtained by capturing one subject at different relative positions and coordinate information for the image data, determines data for two images from among the image data based on the determined display angle and the coordinate information of the image data, and displays the determined two image data in a superimposed manner, so that a three-dimensional image of the subject displayed at an arbitrary angle can be displayed.

Thus, three-dimensional images of the subject at various angles can be displayed and the shape of the subject can be more adequately recognized. In addition, the three-dimensional images can be displayed only by selecting actual images, and therefore there is no need to analyze complicated three-dimensional shape data or the like, which enables three-dimensional images to be displayed by simple control. Moreover, by using actually captured images, a three-dimensional image with less sense of incongruity can be displayed.

FIG. 12 and FIG. 13 represent a display method when combinations of image data capable of displaying three-dimensional images of one subject at a plurality of angles are stored. If there is one combination of images, the combination of the images has only to be displayed on the touch panel 2. In the embodiment, two images are combined to display a three-dimensional image; however, the embodiment is not limited thereto, and three or more images may be combined to display a three-dimensional image. In this way, by combining (superimposing) three or more images to be displayed, it is also possible to display an image that appears in a different state each time an angle of viewing the touch panel 2 is changed.

The image data to be displayed is not limited to image data captured by the mobile phone 1 itself, and therefore it may be configured to acquire, from an external device, a combination of a plurality of pieces of image data obtained by capturing one subject at different angles with coordinate information for the image data, and to use the acquired data to display a three-dimensional image of the subject. In the present embodiment, a plurality of pieces of image data for one subject are stored in the image folder 9G; however, the embodiment is not limited thereto. Therefore, image data and coordinate information may be acquired from an external storage device through communication or the like. In this case, also, the data is processed while being temporarily stored in RAM or so.

Because the embodiment can be implemented with an existing device configuration and the device configuration can be easily made, a distance between the housing and the subject is detected using a focal distance calculated by the autofocus function (aperture control function) of the camera; however, the embodiment is not limited thereto. Therefore, various functions for calculating a distance to the subject can be used. For example, various distance calculating units for calculating a distance to an object, such as an infrared sensor and an ultrasonic sensor, can be used.

In the embodiment, the example of applying the present disclosure to the electronic device with the touch panel as a display unit has been explained; however, the present disclosure is also applicable to an electronic device with a simple display panel, as a display unit, on which a touch sensor is not overlaid.

In the embodiment, the mobile phone has been explained as the one including both the function of capturing a three-dimensional image and the function of displaying the three-dimensional image; however, the embodiment is not limited thereto. Any electronic device having the function of capturing a three-dimensional image according to the embodiment can accept various applications.

Figure 14:
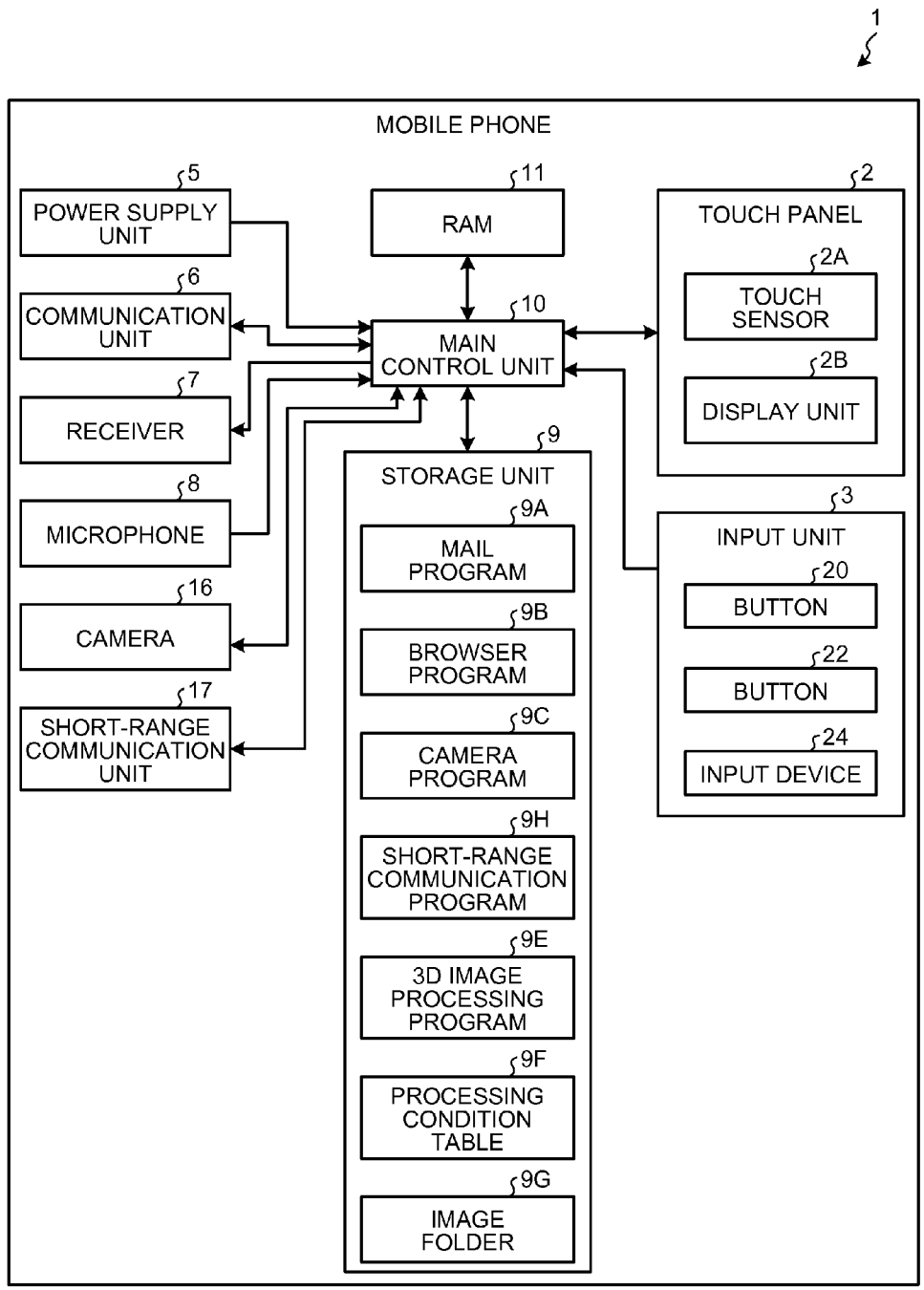
FIG. 14 is a block diagram illustrating a schematic configuration of functions of the mobile phone.

A relation between functions and a control unit of the mobile phone 1 being another embodiment of the mobile electronic device according to the present disclosure will be explained below with reference to FIG. 14. FIG. 14 is a block diagram illustrating a schematic configuration of the functions of the mobile phone 1 illustrated in FIG. 1. As illustrated in FIG. 14, the mobile phone 1 includes the touch panel 2, the input unit 3, the power supply unit 5, the communication unit 6, the receiver 7, the microphone 8, the storage unit 9, the main control unit 10, the RAM (Random Access Memory) 11, the camera 16, and a short-range communication unit 17.

The touch panel 2 includes the display unit 2B and the touch sensor 2A placed over the display unit 2B. The touch sensor 2A detects various operations performed on the touch panel 2 using a finger together with positions on the touch panel 2 where the operations are performed. The operations detected by the touch sensor 2A include an operation of bringing a finger into contact with the surface of the touch panel 2, an operation of moving a finger while keeping the finger in contact with the surface of the touch panel 2, and an operation of removing a finger from the surface of the touch panel 2. Any one of detection methods such as a pressure sensitive type and a capacitive type may be used as the detection method of the touch sensor 2A. The display unit 2B is formed with, for example, an LCD (Liquid Crystal Display) or an OEL (Organic Electro-Luminescence) panel, and displays text, graphics, images, and so on. The display unit 2B can display a three-dimensional (3D) image by displaying a plurality of images in a superimposed manner, i.e., images that the user can view stereoscopically. In other words, the display unit 2B can display a three-dimensional (3D) image by displaying a plurality of images in a superimposed manner.

As explained above, the input unit 3 includes the buttons 20, 22, and the input device 24. The buttons 20 and 22 accept a user operation through a physical input (depression) and transmit a signal corresponding to the accepted operation to the main control unit 10. The input device 24 also accepts a user operation and transmits a signal corresponding to the accepted operation to the main control unit 10.

The power supply unit 5 supplies electric power obtained from a battery or an external power supply to each of the function units of the mobile phone 1 including the main control unit 10. The communication unit 6 establishes a wireless signal path using a CDMA system or so with a base station via a channel allocated by the base station, and performs telephone communication and information communication with the base station. The receiver 7 outputs the voice of the other party on the telephone communication, a ring tone, and the like. The microphone 8 converts the voice of the user or so to electrical signals.

The storage unit 9 is, for example, a nonvolatile memory or a magnetic storage device, and stores therein programs and data used for the processes performed by the main control unit 10. Specifically, the storage unit 9 stores therein the mail program 9A for transmitting, receiving, and browsing mail, the browser program 9B for browsing Web pages, the camera program 9C for capturing an image using the camera 16, a short-range communication program 9H for transmitting and receiving information with other electronic device (imaging device) using the short-range communication unit 17, the 3D (three-dimensional) image processing program 9E for capturing images that can be displayed as a 3D (three-dimensional) image and for displaying the 3D image, the processing condition table 9F associated with various conditions used for executing the various programs, and the image folder 9G storing therein images acquired through capturing or the like. The storage unit 9 also stores therein an operating system program for performing basic functions of the mobile phone 1, and other programs and data such as address book data in which names, telephone numbers, mail addresses, and the like are registered. The storage unit 9 further stores therein programs for determining control operations and processes based on an input operation input to the touch panel 2. The control operations and processes include various operations and processes performed by the mobile phone 1, which are, for example, a movement of a cursor and a pointer, a change of screen display, a character input process, and an activation process and an end process of various applications.

The main control unit 10 is, for example, a CPU (Central Processing Unit), and integrally controls the operations of the mobile phone 1. Specifically, the main control unit 10 executes the programs stored in the storage unit 9 while referring to the data as necessary to execute the various processes by controlling the touch panel 2, the input unit 3, the communication unit 6, the camera 16, the short-range communication unit 17, and the like. The main control unit 10 loads the programs stored in the storage unit 9 and data, which is acquired, generated, or processed by executing the processes, to the RAM 11 providing a temporary storage area as necessary. The programs to be executed and the data to be referred to by the main control unit 10 may be downloaded from a server through wireless communication by the communication unit 6.

As explained above, the camera 16 is an imaging mechanism that includes the capture window 52 used to capture an image and exposed from the housing 12, and that acquires an image of the capture area.

The short-range communication unit 17 is a communication unit (information communication unit) that performs communications with other communication unit (other imaging device) using a short-range wireless communication technology. As the short-range wireless communication technology, infrared communication (IrDA (registered trademark), IrMC (registered trademark), IrSimple (registered trademark)) technology, visible light communication technology, Bluetooth (registered trademark) technology, and RFID (Radio Frequency Identification) technology can be used.

Figure 15:
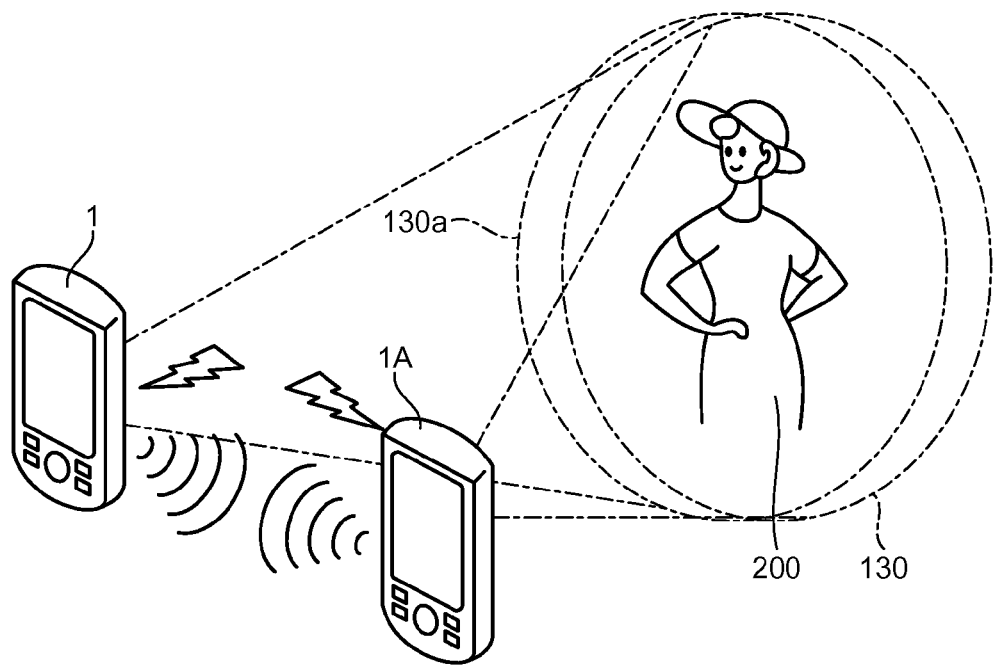
FIG. 15 is an explanatory diagram for explaining a capture operation of the mobile phone.
Figure 16:
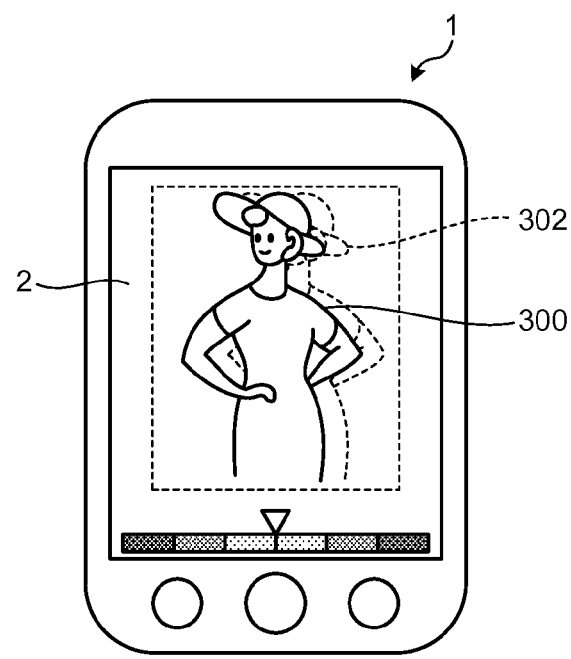
FIG. 16 is an explanatory diagram illustrating an example of a screen displayed during the capture operation of the mobile phone.
Figure 17:
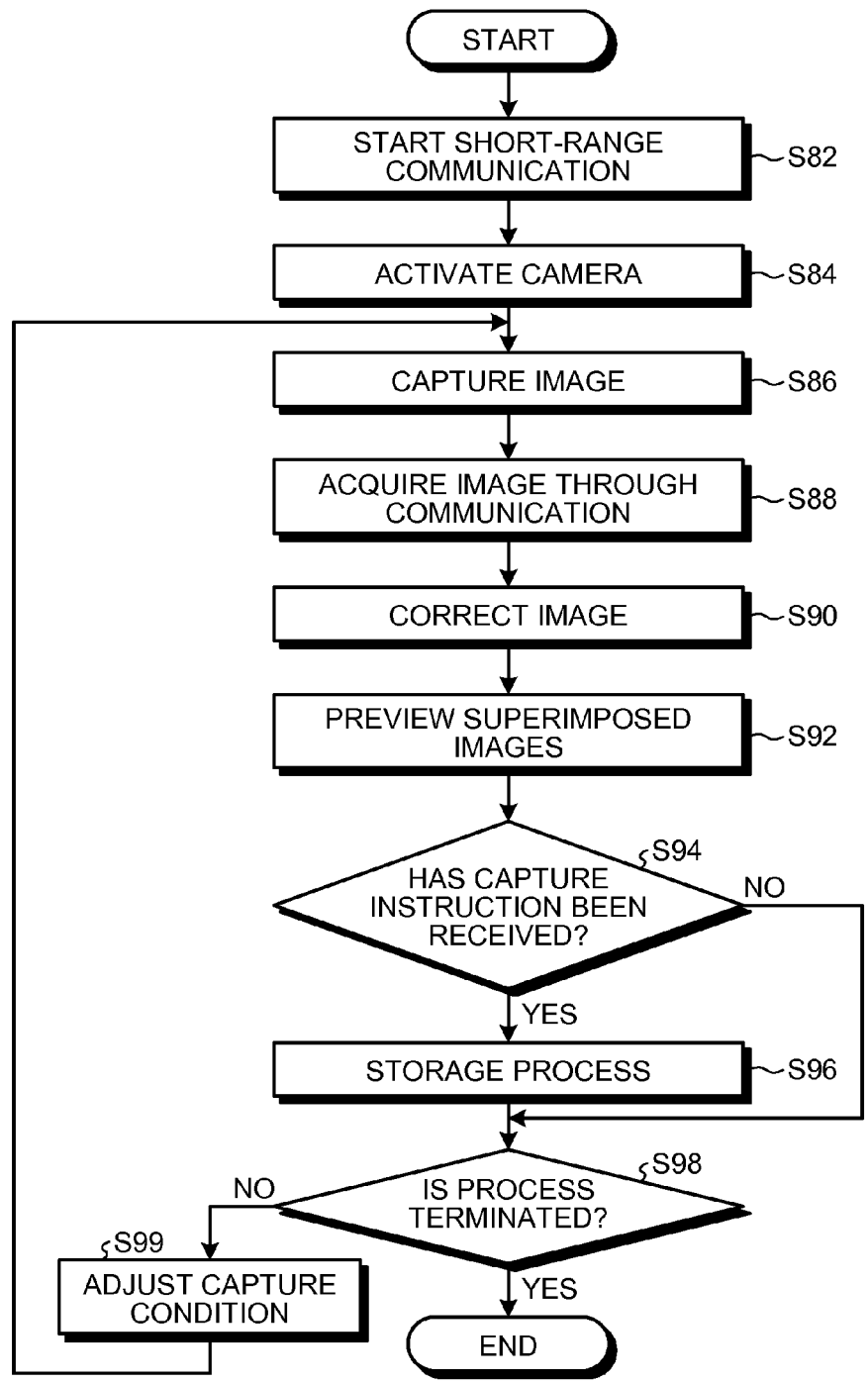
FIG. 17 is a flowchart illustrating an example of processes during the capture operation of the mobile phone.
Figure 18:
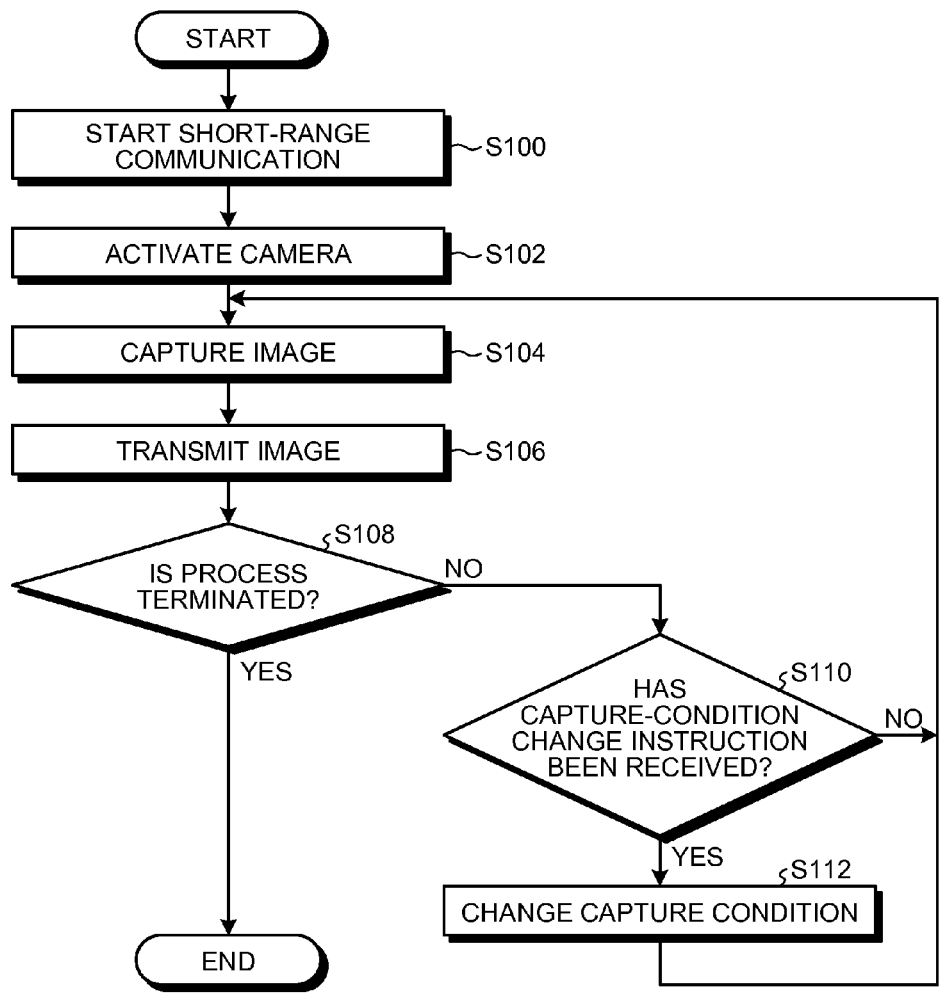
FIG. 18 is a flowchart illustrating an example of processes during a capture operation of a mobile phone.

Then an example of a capture operation will be explained below with reference to FIG. 15 to FIG. 18. FIG. 15 is an explanatory diagram for explaining a capture operation of the mobile phone. FIG. 16 is an explanatory diagram illustrating an example of a screen displayed during the capture operation of the mobile phone. FIG. 17 is a flowchart illustrating an example of processes during the capture operation of the mobile phone. FIG. 18 is a flowchart illustrating an example of processes during a capture operation of a mobile phone.

As illustrated in FIG. 15, the mobile phone 1 acquires an image of the capture area 130 including a subject 200 using the camera 16. The mobile phone 1 performs short-range communication with a mobile phone 1A to acquire an image of the capture area 130*a* including the subject 200 captured by the mobile phone 1A. The mobile phone 1A is an electronic device having the same configuration as that of the mobile phone 1. The mobile phone 1 acquires an image (first image) in the capture area 130 and an image (second image) in the capture area 130*a* to acquire the images capable of displaying the subject 200 as a three-dimensional image. That is, the mobile phone 1 acquires an image captured by the mobile phone 1 and an image captured by the mobile phone 1A (other imaging device) at a different position, to thereby capture the subject 200 at different positions and acquire images capable of stereoscopically viewing the subject 200 (capable of being displayed as a three-dimensional image) by displaying the images in a superimposed manner.

As illustrated in FIG. 16, the mobile phone 1 displays an image (first image) 300 captured by the camera 16 and an image (second image) 302 captured by the mobile phone 1A and acquired through the short-range communication unit 17 on the touch panel 2 in a superimposed manner, thus displaying an image in which the subject can be stereoscopically viewed.

The processing operation of the mobile phone 1 will be explained below with reference to FIG. 17. The processes illustrated in FIG. 17 are an example of the capture operation by the mobile phone 1 for capturing images that can be displayed as a three-dimensional image. The processing procedure illustrated in FIG. 17 is executed based on the functions provided by the camera program 9C, the short-range communication program 9H, and the 3D image processing program 9E. More specifically, the mobile phone 1 analyzes various detection results and images acquired by the function (image capture function) provided by the camera program 9C and by the function (communication function) provided by the short-range communication program 9H based on the function provided by the 3D image processing program 9E, and controls the operations of the function (capture function) provided by the camera program 9C to capture the subject. When an instruction to activate the function for capturing a three-dimensional image is received, the mobile phone 1 performs the processes in FIG. 17.

The mobile phone 1 starts short-range communication such as infrared communication at Step S82. Specifically, the mobile phone 1 activates the short-range communication unit 17 and starts communication with other communicable mobile phone 1A. The mobile phone 1 may determine a mobile phone 1A whose short-range communication function has already been activated as the other party, or may determine a mobile phone 1A whose short-range communication function has been forcefully activated by the mobile phone 1 as the other party. When the short-range communication is started, the mobile phone 1 sends an instruction to perform processes for causing the mobile phone 1A to start capturing an image and transmit the capture image to the mobile phone 1 through the short-range communication.

When the short-range communication is started at Step S82, then at Step S84, the mobile phone 1 activates the camera 16. The processes at Step S82 and Step S84 may be simultaneously performed or may be performed in reverse order. If the camera 16 has already been activated, then the processes do not have to be performed.

When the camera 16 is activated at Step S84, then at Step S86, the mobile phone 1 captures an image. That is, the mobile phone 1 acquires a first image. When the image is acquired at Step S86, then at Step S88, the mobile phone 1 acquires an image (second image) through communication. That is, the mobile phone 1 acquires data for the image (second image) captured by the mobile phone 1A through the short-range communication.

When the image data captured by the mobile phone 1A is acquired at Step S88, then at Step S90, the mobile phone 1 performs image correction. Specifically, the mobile phone 1 compares the first image captured at Step S86 with the second image acquired at Step S88, cuts off surrounding scenery or the like included only in either one of the images, and makes the subjects, sceneries, and the like included in the two images have the same structures as each other.

When the image correction is performed at Step S90, then at Step S92, the mobile phone 1 previews the images in a superimposed manner. That is, the mobile phone 1 displays the first image and the second image, for which the image correction has been performed, on the touch panel 2 in a superimposed manner. The mobile phone 1 compares the images to thereby adjust display positions of the first image and the second image, so that the images are displayed as a three-dimensional image capable of stereoscopically viewing the subject. Images incapable of stereoscopically viewing the subject may be previewed depending on the states of the first image and the second image.

When the images are previewed at Step S92, then at Step S94, the mobile phone 1 determines whether a capture instruction has been received. The capture instruction indicates an operation as a trigger to capture an image, so-called a shutter operation. When it is determined that the capture instruction has not been received at Step S94 (No), that is, that the shutter has not been pressed, the mobile phone 1 proceeds to Step S98.

When it is determined that the capture instruction has been received at Step S94 (Yes), then at Step S96, the mobile phone 1 stores the first image and the second image which are being previewed in the image folder 9G of the storage unit 9. The mobile phone 1 may display the captured images and an inquiry image as to whether to store the captured images on the touch panel 2, and store the images when detecting a storage instruction from the user. After the storage process at Step S96, the mobile phone 1 proceeds to Step S98.

When it is determined as No at Step S94 or when the process at Step S96 has been performed, then at Step S98, the mobile phone 1 determines whether the process is terminated. That is, the mobile phone 1 determines whether capture of a three-dimensional image is terminated.

When it is determined that the process is not terminated at Step S98 (No), then at Step S99, the mobile phone 1 adjusts the capture conditions. Specifically, the mobile phone 1 causes the main control unit 10 to execute the processes of the camera program 9C, thereby adjusts the capture conditions such as focal distance, magnification (zoom), and exposure, and adjusts the subjects in the captured images so that their brightness, sizes, and the like become equivalent to each other. The mobile phone 1 also adjusts the capture conditions of the camera of the mobile phone 1A in addition to the capture conditions of the camera 16. In this case, the mobile phone 1 transmits an instruction to change the capture conditions through the short-range communication. The mobile phone 1 previously acquires the capture conditions of the camera of the mobile phone 1A through the short-range communication, and can thereby appropriately adjust the capture conditions of the second image. After the adjustment of the capture conditions at Step S99, the mobile phone 1 proceeds to Step S86 and again executes the processes. When it is determined that the process is terminated at Step S98 (Yes), the mobile phone 1 ends the present process.

Then a processing operation of other mobile phone will be explained below with reference to FIG. 18. The processes illustrated in FIG. 18 are an example of the capture operation executed by the mobile phone 1A when the mobile phone 1 captures images that can be displayed as a three-dimensional image. The processing procedure illustrated in FIG. 18 is executed based on the functions provided by the camera program 9C, the short-range communication program 9H, and the 3D image processing program 9E of the mobile phone 1A. More specifically, the mobile phone 1A analyzes various detection results and images acquired by the function (image capture function) provided by the camera program 9C and by the function (communication function) provided by the short-range communication program 9H based on the function provided by the 3D image processing program 9E, and controls the operations of the function (capture function) provided by the camera program 9C to capture the subject.

The mobile phone 1A starts short-range communication at Step S100. Specifically, the mobile phone 1A activates the short-range communication unit 17 and starts communication with the communicable mobile phone 1. As explained above, the mobile phone 1A may activate the short-range communication function based on the user operation or may activate the short-range communication function based on the instruction from the mobile phone 1. When the short-range communication is started, the mobile phone 1A executes the processing operation based on the instruction received through the short-range communication.

When the short-range communication is started at Step S100, then at Step S102, the mobile phone 1A activates the camera 16. When the camera 16 is activated at Step S102, then at Step S104, the mobile phone 1A captures an image. That is, the mobile phone 1A acquires the second image. When the image is acquired at Step S104, then at Step S106, the mobile phone 1A transmits the captured image (second image). That is, the mobile phone 1A transmits the data for the captured image (second image) to the mobile phone 1 through the short-range communication.

When the captured image is transmitted at Step S106, then at Step S108, the mobile phone 1A determines whether the process is terminated. That is, the mobile phone 1A determines whether the capture of the image and the transmission of the captured image are terminated.

When it is determined that the process is not terminated at Step S108 (No), then at Step S110, the mobile phone 1A determines whether a capture-condition change instruction has been received. That is, the mobile phone 1A determines whether a capture-condition change instruction has been received from the mobile phone 1 through the short-range communication. When it is determined that the change instruction has not been received at Step S110 (No), the mobile phone 1A proceeds to Step S104 and again executes the processes. When it is determined that the change instruction has been received at Step S110 (Yes), then at Step S112, the mobile phone 1A changes the capture conditions. Specifically, the mobile phone 1A causes the main control unit 10 to execute the processes of the camera program 9C based on the capture-condition change instruction, and thereby adjusts the capture conditions such as focal distance, magnification (zoom), and exposure. After the change in the capture conditions at Step S112, the mobile phone 1 proceeds to Step S104 and again executes the processes. When it is determined that the process is terminated at Step S108 (Yes), the mobile phone 1 ends the present process.

In this way, the mobile phone 1 captures the first image using the camera 16, performs the short-range communication with the mobile phone 1A to acquire the second image captured by the mobile phone 1A, and previews the first image and the second image in a superimposed manner, and thereby allows the user to capture the images while checking the images in which the two image data are superimposed on each other. Thus, the capture can be performed while checking actual images, and this enables to prevent a case in which the sense of incongruity is caused when the images are superposed in order to display a three-dimensional image. In addition, the capture position and the capture area can be also adequately adjusted. Moreover, the mobile phone 1 corrects the image at Step S90 and can thereby acquire the image data capable of displaying a more adequate three-dimensional image.

The mobile phone 1 detects and adjusts both of the capture conditions to thereby enable to display a more appropriate three-dimensional image. Especially, by controlling the exposure, the brightness of the first image and that of the second image can be adjusted to the same level, and this enables to more reliably suppress the sense of incongruity against the three-dimensional image.

Here, the mobile phone 1 preferably transmits the image captured by the camera 16 to the mobile phone 1A through the short-range communication. This also enables to display the three-dimensional image obtained by superimposing the first image and the second image on each other on the mobile phone 1A, so that capture positions can be more smoothly and adequately adjusted.

As explained in the embodiment illustrated in FIG. 14 to FIG. 18, by adjusting both the capture conditions in the mobile phone 1 and the mobile phone 1A, the sense of incongruity against the three-dimensional image can be more reliably suppressed. However, by adjusting the capture conditions in either one of the mobile phone 1 and the mobile phone 1A, the sense of incongruity against the three-dimensional image can be suppressed. When the capture conditions in the mobile phone 1 are to be adjusted, the mobile phone 1 can adjust the capture conditions based on only a result of image analysis without acquiring information on image conditions from the mobile phone 1A. When the capture conditions in only the mobile phone 1A are to be adjusted, as explained above, the mobile phone 1 acquires information on image conditions of the mobile phone 1A and changes the capture conditions based on the acquired capture conditions.

Because the embodiment illustrated in FIG. 14 to FIG. 18 can be implemented with an existing device configuration and the device configuration can be made simple, a distance between the housing and the subject is detected using a focal distance calculated by the auto-focus function (aperture control function) of the camera; however, the embodiment is not limited thereto. Therefore, various functions for calculating a distance to the subject can be used. For example, various distance calculating units for calculating a distance to an object, such as an infrared sensor and an ultrasonic sensor, can be used.

Figure 19:
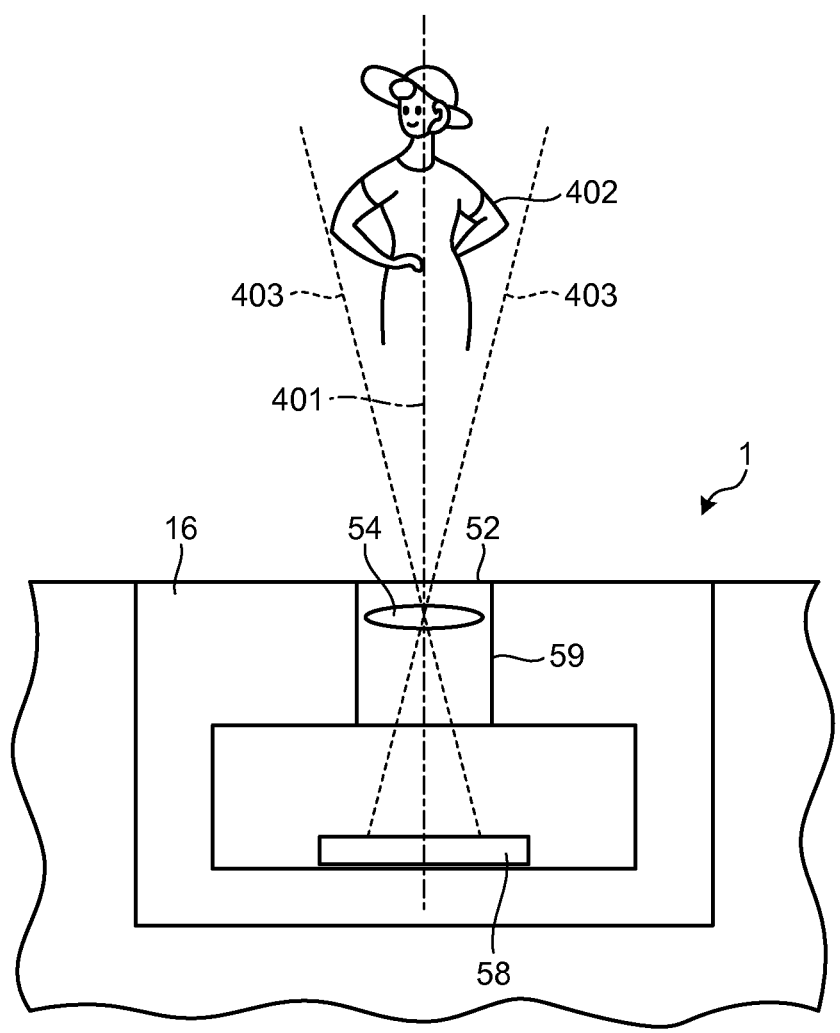
FIG. 19 is an explanatory diagram for explaining a capture operation of the mobile phone.
Figure 20:
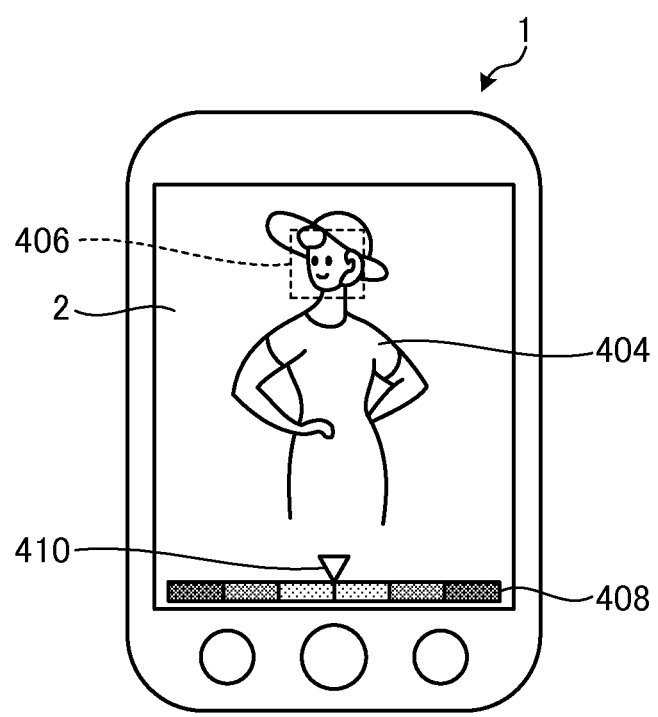
FIG. 20 is an explanatory diagram illustrating an example of a screen displayed during the capture operation of the mobile phone.
Figure 21:
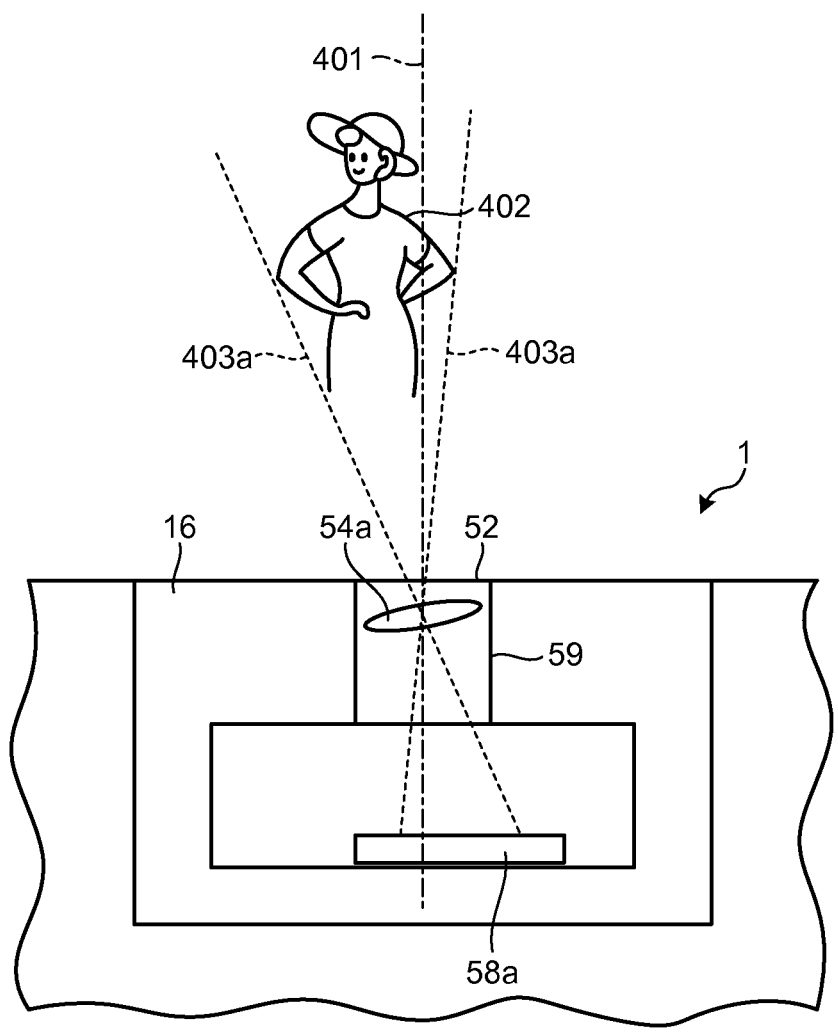
FIG. 21 is an explanatory diagram for explaining a capture operation of the mobile phone.
Figure 22:
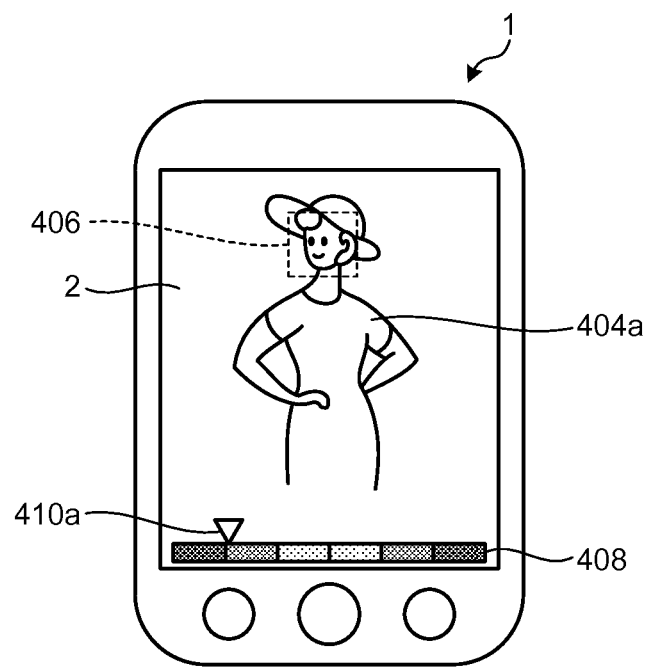
FIG. 22 is an explanatory diagram illustrating an example of a screen displayed during the capture operation of the mobile phone.

A preferred example of a capture operation will be explained below with reference to FIG. 19 to FIG. 22. FIG. 19 is an explanatory diagram for explaining a capture operation of the mobile phone 1. FIG. 20 is an explanatory diagram illustrating an example of a screen displayed during the capture operation of the mobile phone. FIG. 21 is an explanatory diagram for explaining a capture operation of the mobile phone 1. FIG. 22 is an explanatory diagram illustrating an example of a screen displayed during the capture operation of the mobile phone 1. The mobile phone 1 preferably detects the position of the subject and adjusts the capture area when an image is captured. Specifically, the mobile phone 1 preferably analyzes an image to determine the position of the subject within the image and adjusts the direction of the camera (angle of the capture area) to the direction in which the subject can be captured.

For example, as illustrated in FIG. 19, when a subject 402 is in the front of the mobile phone 1, i.e., a subject 402 is in a position where it overlaps a central line 401, the camera 16 captures an image as it is without moving a capture area 403. When the image is acquired in the state illustrated in FIG. 19, as illustrated in FIG. 20, an image in which a subject 404 is positioned at its center is displayed on the touch panel 2 of the mobile phone 1. In other words, an image in which the subject 404 is positioned at its center can be captured. The mobile phone 1 performs image processing on the image to extract a position of a face 406 of the subject 404, and can thereby determine the position of the subject 404. Displayed on the touch panel 2 are a bar 408 as an indication indicating a range of an adjustable capture angle of the camera 16 and a mark 410 as an indication indicating a position, in the range, where the image has been captured. As illustrated in FIG. 20, the capture area is not moved, and therefore the mark 410 is displayed in a state of pointing to the center of the bar 408.

Then as illustrated in FIG. 21, when the subject 402 is not in the front of the mobile phone 1, i.e., when the subject 402 is not in a position where it overlaps the central line 401, the camera 16 moves a capture area 403a according to the position of the subject 402, to capture an image. As illustrated in FIG. 21, the capture area 403a is moved to the left in the diagram by a predetermined angle. Specifically, the capture-angle adjustment mechanism 59 adjusts an optical system 54a and a light-receiving unit 58a to the positional relation illustrated in FIG. 21 so that the capture area 403a can be captured. When the image is acquired in the state illustrated in FIG. 21, as illustrated in FIG. 22, an image in which a subject 404a is placed at its center is displayed on the touch panel 2 of the mobile phone 1. In this way, the portions are moved by the capture-angle adjustment mechanism 59 so as to obtain the capture area 403a, to thereby enable to capture an image in which the subject 404a is positioned at its center. Displayed on the touch panel 2 are the bar 408 as the indication indicating the range of the adjustable capture angle by the camera 16 and a mark 410a as an indication indicating a position, in the range, where the image has been captured. As illustrated in FIG. 22, the capture area is moved, and therefore the mark 410a is displayed at a position on the left side of the center of the bar 408.

In this way, by adjusting the capture area according to the position of the subject, an image in which the subject is placed at the center of the image can be captured even if the relative position is displaced and the subject is not on the central line. This enables to prevent such a situation that no subject is included in an image and a three-dimensional image of the subject cannot thereby be created.

By displaying a relation between an adjustment range of the capture area and a current capture area on the screen, the user can be notified of a displacement between the central line and the subject. Thus, the subject can be held within an adjustable range.

In the embodiment illustrated in FIG. 19 to FIG. 22, the position of the subject is determined using face recognition; however, the embodiment is not limited thereto. For example, a displacement of a relative position may be detected based on a difference between the image and the previous image. Alternatively, the subject may be identified by recognizing the position specified by the user as a position of the subject and identifying the shape of the image at the position.

In the embodiment illustrated in FIG. 19 to FIG. 22, the capture area of the camera 16 is mechanically adjusted and the subject is adjusted so as to be at the center of the image (predetermined range); however, the embodiment is not limited thereto. The mobile phone 1 may preset only part of the capture area as an acquisition area of an image, that is, acquire a trimmed image, and change a position where the image is trimmed according to the displacement of the relative position. By using this method, the subject can also be held at a predetermined position of the image.

In the embodiment illustrated in FIG. 19 to FIG. 22, the capture area of the mobile phone 1 is adjusted; however, the capture area of the mobile phone 1A can also be adjusted. That is, the capture area can be adjusted as capture conditions. In this way, by adjusting also the capture area of the mobile phone 1A, even if the direction of the housing 12 is displaced, a three-dimensional image with a larger overlapping area can be acquired.

The mobile phone 1 preferably detects a relative position to the mobile phone 1A, as capture conditions. The relative position can be detected by providing GPS communication units to detect absolute positions of each other, by detecting a relative position based on a radio field intensity or the like of communication with the short-range communication unit 17, or by analyzing the captured image to detect a relative position. When a relative position is detected, a movement instruction for moving to a more appropriate capture position is preferably output using a display on the touch panel 2 or using a sound. Thus, a more appropriate three-dimensional image can be captured. In addition, by displaying a guide of movement, the user does not have to try moving to various directions while viewing a preview image, and therefore a more appropriate three-dimensional image can be captured in an easier way.

In the embodiment illustrated in FIG. 14 to FIG. 22, because the user can also adjust and check a three-dimensional image to be acquired, the three-dimensional image has been previewed; however, the mobile phone 1 does not have to preview the image. In this case, the mobile phone 1 adjusts the conditions of images to be captured using various capture conditions and a relative position between the mobile phone 1 and the mobile phone 1A, so that the images capable of being displayed as a three-dimensional image can be acquired. In this case, the mobile phone 1 can also acquire data for the second image from the mobile phone 1A after detection of the capture instruction.

The mobile phone 1 according to the embodiment illustrated in FIG. 14 to FIG. 22 allows quick sending and receiving of information and keeps up with its actual usage status, and therefore transmits/receives information to/from the mobile phone 1A through the short-range communication; however, the communication method is not limited thereto. The mobile phone 1 may communicate with the mobile phone 1A by the communication through a base station.

In the embodiment illustrated in FIG. 14 to FIG. 22, any device from which the mobile phone 1 acquires an image through the short-range communication is set as a mobile phone 1A configured in the above manner; however, the embodiment is not limited thereto. The device from which the mobile phone 1 acquires an image through the short-range communication has only to include an imaging function and a communication function with the mobile phone 1.

In the embodiment illustrated in FIG. 14 to FIG. 22, the example of applying the present disclosure to the electronic device with the touch panel as a display unit has been explained; however, the present disclosure is also applicable to an electronic device with a simple display panel, as a display unit, on which a touch sensor is not overlaid.

Figure 23:
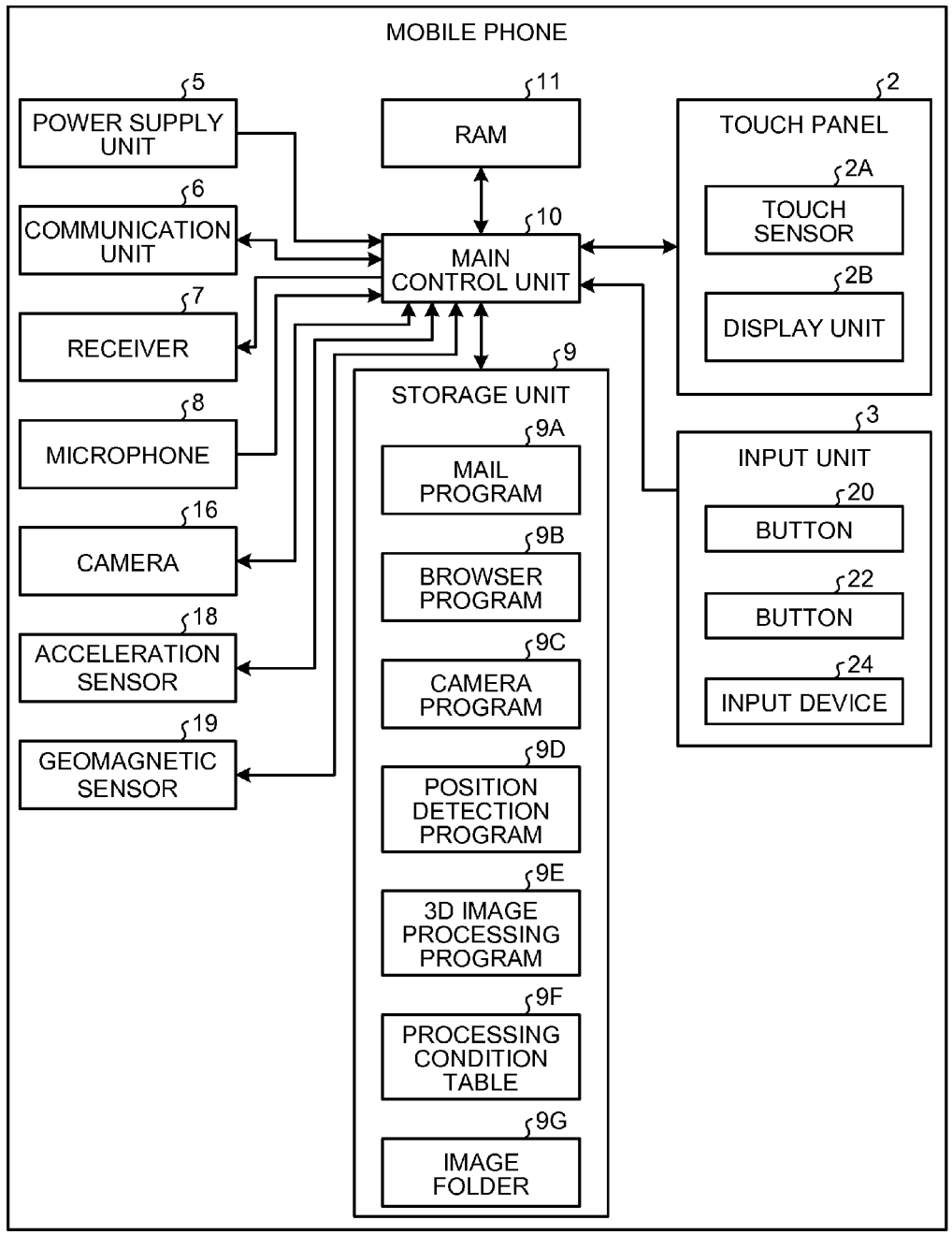
FIG. 23 is a block diagram illustrating a schematic configuration of functions of the mobile phone.

A relation between the functions and the control unit of the mobile phone 1 being another embodiment of the mobile electronic device according to the present disclosure will be explained below with reference to FIG. 23. FIG. 23 is a block diagram illustrating the schematic configuration of the functions of the mobile phone 1 illustrated in FIG. 1. As illustrated in FIG. 23, the mobile phone 1 includes the touch panel 2, the input unit 3, the power supply unit 5, the communication unit 6, the receiver 7, the microphone 8, the storage unit 9, the main control unit 10, the RAM (Random Access Memory) 11, the camera 16, an acceleration sensor 18, and a geomagnetic sensor 19. A combination of the acceleration sensor 18, the geomagnetic sensor 19, the auto-focus function of the camera 16, and the function of the control unit for processing the information acquired by these functions corresponds to a relative-position acquiring unit.

The touch panel 2 includes the display unit 2B and the touch sensor 2A placed over the display unit 2B. The touch sensor 2A detects various operations performed on the touch panel 2 using a finger together with positions on the touch panel 2 where the operations are performed. The operations detected by the touch sensor 2A include an operation of bringing a finger into contact with the surface of the touch panel 2, an operation of moving a finger while keeping the finger in contact with the surface of the touch panel 2, and an operation of removing a finger from the surface of the touch panel 2. Any one of detection methods such as a pressure sensitive type and a capacitive type may be used as the detection method of the touch sensor 2A. The display unit 2B is formed with, for example, an LCD (Liquid Crystal Display) or an OEL (Organic Electro-Luminescence) panel, and displays text, graphics, images, and so on. The display unit 2B can display a three-dimensional (3D) image by displaying a plurality of images in a superimposed manner, i.e., images that the user can view stereoscopically. In other words, the display unit 2B can display a three-dimensional (3D) image by displaying a plurality of images in a superimposed manner.

As explained above, the input unit 3 includes the buttons 20, 22, and the input device 24. The buttons 20 and 22 accept a user operation through a physical input (depression) and transmit a signal corresponding to the accepted operation to the main control unit 10. The input device 24 also accepts a user operation and transmits a signal corresponding to the accepted operation to the main control unit 10.

The power supply unit 5 supplies electric power obtained from a battery or an external power supply to each of the function units of the mobile phone 1 including the main control unit 10. The communication unit 6 establishes a wireless signal path using a CDMA system or so with a base station via a channel allocated by the base station, and performs telephone communication and information communication with the base station. The receiver 7 outputs the voice of the other party on the telephone communication, a ring tone, and the like. The microphone 8 converts the voice of the user or so to electrical signals.

The storage unit 9 is, for example, a nonvolatile memory or a magnetic storage device, and stores therein programs and data used for the processes performed by the main control unit 10. Specifically, the storage unit 9 stores therein the mail program 9A for transmitting, receiving, and browsing mail, the browser program 9B for browsing Web pages, the camera program 9C for capturing an image using the camera 16, the position detection program 9D for detecting a position of the mobile phone 1 or a relative position between the mobile phone 1 and a subject based on detection results of the acceleration sensor 18 and the geomagnetic sensor 19 and so on, the 3D (three-dimensional) image processing program 9E for capturing images that can be displayed as a 3D (three-dimensional) image and for displaying the 3D image, the processing condition table 9F associated with various conditions used for executing the various programs, and the image folder 9G storing therein images acquired through capturing or the like. The storage unit 9 also stores therein an operating system program for performing basic functions of the mobile phone 1, and other programs and data such as address book data in which names, telephone numbers, mail addresses, and the like are registered. The storage unit 9 further stores therein programs for determining control operations and processes based on an input operation input to the touch panel 2. The control operations and processes include various operations and processes performed by the mobile phone 1, which are, for example, a movement of a cursor and a pointer, a change of screen display, a character input process, and an activation process and an end process of various applications.

FIG. 24 is an explanatory diagram illustrating an example of data stored in the image folder. As illustrated in FIG. 24, a plurality of pieces of image data are stored in the image folder 9G, in which a folder name, a file name, and coordinate information are associated with each of the image data. Image data obtained by capturing the same subject are associated with each other using the same folder name to be stored in the image folder 9G. The coordinate information is information on a relative position between a subject and a capture position, and pieces of the image data associated with the same folder are associated with the coordinate information calculated by using the same axes.

The main control unit 10 is, for example, a CPU (Central Processing Unit), and integrally controls the operations of the mobile phone 1. Specifically, the main control unit 10 executes the programs stored in the storage unit 9 while referring to the data stored in the storage unit 9 as necessary to execute the various processes by controlling the touch panel 2, the input unit 3, the communication unit 6, the camera 16, the acceleration sensor 18, the geomagnetic sensor 19, and the like. The main control unit 10 loads the programs stored in the storage unit 9 and data, which is acquired, generated, or processed by executing the processes, to the RAM 11 providing a temporary storage area as necessary. The programs to be executed and the data to be referred to by the main control unit 10 may be downloaded from a server through wireless communication by the communication unit 6.

As explained above, the camera 16 is an imaging mechanism that includes the capture window 52 used to capture an image and exposed from the housing 12, and that acquires an image of the capture area.

The acceleration sensor 18 is a detector for detecting an acceleration applied to the housing 12. As the acceleration sensor 18, a detector for detecting an acceleration by various methods can be used, and, for example, a detector for detecting an acceleration using change in capacitance, change in piezoresistance, change in relative position, or the like can be used. The acceleration sensor 18 also detects a direction of an acceleration in addition to a magnitude of the acceleration. The acceleration sensor 18 detects an acceleration acting on the housing 12 when the operator moves or shakes the housing 12, and transmits the detected acceleration information to the main control unit 10. The main control unit 10 executes the position detection program 9D and analyzes detection results of the acceleration sensor 18, i.e., adds up information on the detected accelerations, to thereby enable to calculate a change amount of the attitude of the housing 12 and a movement distance thereof, thus detecting a movement of the mobile phone 1 (housing 12).

The geomagnetic sensor 19 is a detector that detects a direction of the housing 12. The geomagnetic sensor 19 detects a direction of the geomagnetism in three directions which are orthogonal to one another. As the detector that detects the geomagnetism, a Hall element, an MR element, an MI element, a fluxgate element, or the like can be used. The geomagnetic sensor 19 transmits a detection result as the direction of the geomagnetism detected in the three directions to the main control unit 10. The main control unit 10 executes the position detection program 9D and analyzes the detection result of the geomagnetic sensor 19, and can thereby detect the direction (bearing) of the mobile phone 1 (housing 12).

Figure 25:
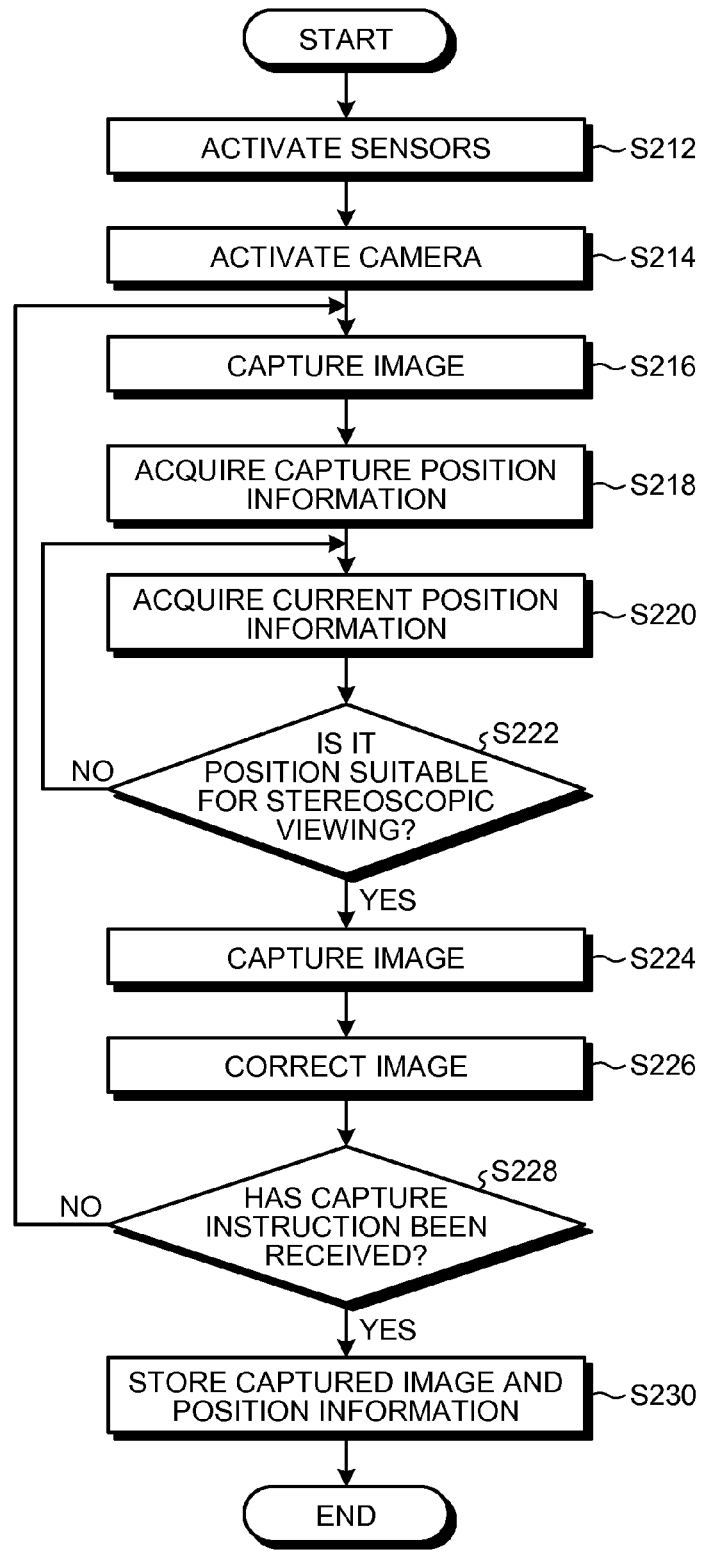
FIG. 25 is a flowchart illustrating an example of processes during the capture operation of the mobile phone.
Figure 26:
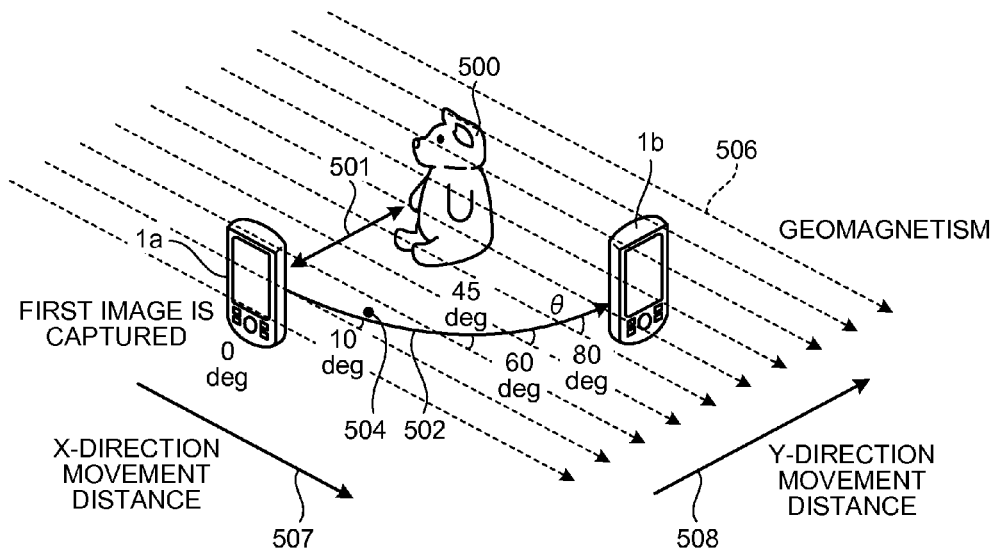
FIG. 26 is an explanatory diagram for explaining a capture operation of the mobile phone.
Figure 27:
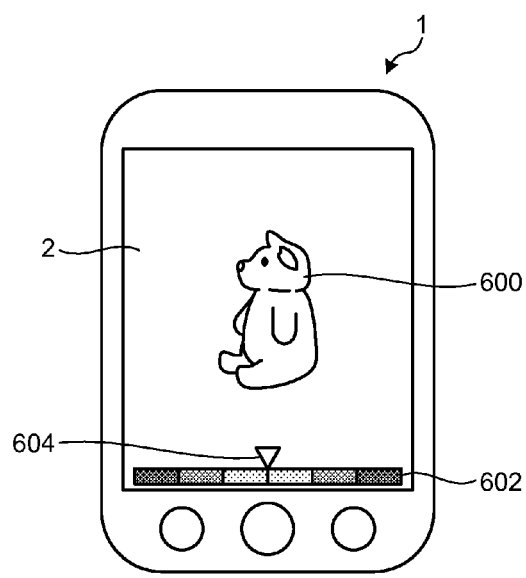
FIG. 27 is an explanatory diagram illustrating an example of a screen displayed during the capture operation of the mobile phone.

Then an example of a capture operation will be explained below with reference to FIG. 25 to FIG. 27. FIG. 25 is a flowchart illustrating an example of processes during the capture operation of the mobile phone. FIG. 26 is an explanatory diagram for explaining the capture operation of the mobile phone. FIG. 27 is an explanatory diagram illustrating an example of a screen displayed during the capture operation of the mobile phone. The processes illustrated in FIG. 25 are an example of the capture operation of the mobile phone 1 for capturing images that can be displayed as a three-dimensional image. The processing procedure illustrated in FIG. 25 is executed based on the functions provided by the camera program 9C, the position detection program 9D, and the 3D image processing program 9E. More specifically, the mobile phone 1 analyzes various detection results and images acquired by the function (image capture function) provided by the camera program 9C and by the function (position detection function) provided by the position detection program 9D based on the function provided by the 3D image processing program 9E, and controls the operation of the function (capture function) provided by the camera program 9C to capture the subject. When an instruction to activate the function of capturing a three-dimensional image is received, the mobile phone 1 performs the processes illustrated in FIG. 25.

The mobile phone 1 activates the sensors at Step S212. Specifically, the mobile phone 1 activates the acceleration sensor 18 and the geomagnetic sensor 19. When the sensors are activated at Step S212, then at Step S214, the mobile phone 1 activates the camera 16. The processes at Step S212 and Step S214 may be simultaneously performed or may be performed in reverse order. If those have already been activated, the processes do not have to be performed.

When the camera 16 is activated at Step S214, then at Step S216, the mobile phone 1 captures an image. That is, the mobile phone 1 acquires a first image. The mobile phone 1 temporarily stores the data for the acquired image in the RAM 11, the storage unit 9, or the like. When the image is acquired at Step S216, then at Step S218, the mobile phone 1 acquires capture position information. Specifically, the mobile phone 1 detects a position of the housing 12 using the information detected by the acceleration sensor 18 and the geomagnetic sensor 19, further detects a distance between the mobile phone 1 (housing 12) and a subject using the focus function of the camera 16, and acquires information for a relative positional relation (relative position). The mobile phone 1 sets an initially detected relative position as a reference for a relative position. The mobile phone 1 temporarily stores the acquired capture position information.

When the capture position information is acquired at Step S218, then at Step S220, the mobile phone 1 acquires current position information. Specifically, the mobile phone 1 acquires information for a current relative position based on the information acquired from the sensors in the same manner as that at Step S208.

When the current position information is acquired at Step S220, then at Step S222, the mobile phone 1 determines whether the position is suitable for stereoscopic viewing. That is, the mobile phone 1 determines whether the captured image and an image to be captured are capable of displaying a stereoscopic image of the subject. For example, the mobile phone 1 calculates a movement distance of the mobile phone 1 (housing 12) from the capture position, calculates a vertex angle of an isosceles triangle formed with the capture position, the current position, and the subject (a triangle in which a line connecting the subject and the capture position and a line connecting the subject and the current position are equal in length), and determines whether the vertex angle is suitable for stereoscopic viewing.

When it is determined that the position is not suitable for stereoscopic viewing at Step S222 (No), the mobile phone 1 proceeds to Step S220. That is, the mobile phone 1 repeats the processes at Step S220 and Step S222 until the mobile phone 1 moves to any position suitable for stereoscopic viewing. When it is determined that the position is not suitable for stereoscopic viewing, the mobile phone 1 may recapture a first image. In other words, when it is determined as No at Step S222, the process may proceed to Step S216. When it is determined that the position is suitable for stereoscopic viewing at Step S222 (Yes), then at Step S224, the mobile phone 1 captures an image (second image). That is, the mobile phone 1 captures an image that can display a 3D image of the subject by being displayed with the image captured at Step S216. The mobile phone 1 temporarily stores the data for the second image captured at Step S224 and the capture position information on the data for the second image (information acquired at the latest Step S220). The mobile phone 1 may display the captured two images on the touch panel 2 in a superimposed manner to preview a three-dimensional image thereof.

When the image is captured at Step S224, then at Step S226, the mobile phone 1 corrects the image. Specifically, the mobile phone 1 compares the first image captured at Step S216 with the second image captured at Step S224, cuts off surrounding scenery or the like included only in either one of the images, and makes the subjects, sceneries, and the like included in the two images have the same structures as each other.

When the image is corrected at Step S226, then at Step S228, the mobile phone 1 determines whether a capture instruction has been received. The capture instruction indicates an operation as a trigger to capture an image, so-called a shutter operation. When it is determined that the capture instruction has not been received at Step S228 (No), that is, that the shutter has not been pressed, the mobile phone 1 proceeds to Step S216 and repeats the processes. At this time, the mobile phone 1 discards (deletes) the temporarily stored capture data and capture position information.

When it is determined that the capture instruction has been received at Step S228 (Yes), then at Step S230, the mobile phone 1 stores the captured images and the position information in the image folder 9G of the storage unit 9. The mobile phone 1 may display the captured images and an inquiry image as to whether to store the captured images on the touch panel 2, and store the images when detecting a storage instruction from the user. After the storage process at Step S230, the mobile phone 1 ends the present process.

For example, as illustrated in FIG. 26, when an image of a subject 500 is captured at a position indicated by a mobile phone 1a, the mobile phone 1 detects a position of the mobile phone 1a and a distance 501 between the mobile phone 1a and the subject 500. Thereafter, when the mobile phone 1a has moved to a position indicated by a mobile phone 1b along a movement indicated by arrow 502, the mobile phone 1 determines, while detecting the movement, whether it is the position where an image capable of creating a three-dimensional image together with the image acquired by the mobile phone 1a can be captured. The mobile phone 1a detects an acceleration using the acceleration sensor 18 while detecting a change in its direction using the geomagnetic sensor 19, and can thereby detect the movement in the direction indicated by the arrow 502. That is, the mobile phone 1a detects the change in its direction with respect to geomagnetism 506 using the geomagnetic sensor 19, and thereby detects a change in the direction of the mobile phone 1 (housing 12) with respect to absolute coordinates thereof. The mobile phone 1a performs calculation using the acceleration acting on the mobile phone 1 (housing 12) and the direction of the mobile phone 1 (housing 12) obtained by the acceleration sensor 18, and thereby detects an X-direction movement distance 507 and a Y-direction movement distance 508 of the mobile phone 1 (housing 12) and also detects a θ-direction rotation thereof. The mobile phone 1 uses the movement of the mobile phone 1 and the distance to the subject 500 calculated in this manner to thereby enable to calculate a relative movement and a relative position (coordinate information).

When it is determined that a position 504 is a position where an image capable of forming a three-dimensional image can be captured, the mobile phone 1 captures a second image, and, thereafter, determines whether the shutter has been pressed. When the mobile phone 1 further moves without pressing of the shutter, the mobile phone 1 discards the two images and captures a first image again. The mobile phone 1 repeats acquisition and discard of images in this way until the shutter is pressed and can thereby acquire a three-dimensional image at the position where the shutter is pressed. For example, as illustrated in FIG. 27, a three-dimensional image 600 of the subject can be acquired. A bar 602 displayed on the touch panel 2 in FIG. 27 is an indication indicating a range of an adjustable capture angle of the camera 16 and a mark 604 is an indication indicating a position, in the range, where the image has been captured.

In this way, the mobile phone 1 uses the acceleration sensor 18 and the geomagnetic sensor 19 to detect a movement of the mobile phone 1 (housing 12, the mobile phone 1), i.e., a relative position to the subject, and can thereby detect a relative relationship between the first image and the second image with high precision. This enables to acquire an image at a position where a three-dimensional image of the subject can be more appropriately captured. Moreover, a single unit of mobile phone 1 can capture a combination of image data capable of three-dimensional display.

The mobile phone 1 can also store coordinate information for both the image data (information for a relative position between the subject and the capture position). Thus, a relation between the images used for three-dimensional display is made clear, and a three-dimensional image can thereby be appropriately displayed.

In the embodiment illustrated in FIG. 23 to FIG. 27, two image data forming a three-dimensional image are acquired before the shutter is pressed; however, the embodiment is not limited thereto. For example, it may be configured to capture a first image at a shutter-pressed position and then give a movement instruction to the user, and to capture a second image when an appropriate relative position is detected. In this case, by displaying a direction of movement and a direction instruction of the housing 12 on the touch panel 2 in detail, the mobile phone 1 can cause itself to be moved to an appropriate position. In addition, a three-dimensional image can be captured in a short time.

In the embodiment illustrated in FIG. 23 to FIG. 27, two images are used to display one three-dimensional image; however, more pieces of images may be used to display one three-dimensional image. In this case, the mobile phone 1 captures images in required relative positions by corresponding pieces, and can thereby capture a three-dimensional image formed with a plurality of pieces of image data.

In the embodiment illustrated in FIG. 23 to FIG. 27, the case of capturing one three-dimensional image has been explained; however, the embodiment is not limited thereto. The mobile phone 1 can capture images so that a plurality of three-dimensional images can be displayed. In other words, images can be captured so that three-dimensional images when one subject is viewed from a plurality of different angles can be displayed.

Figure 28:
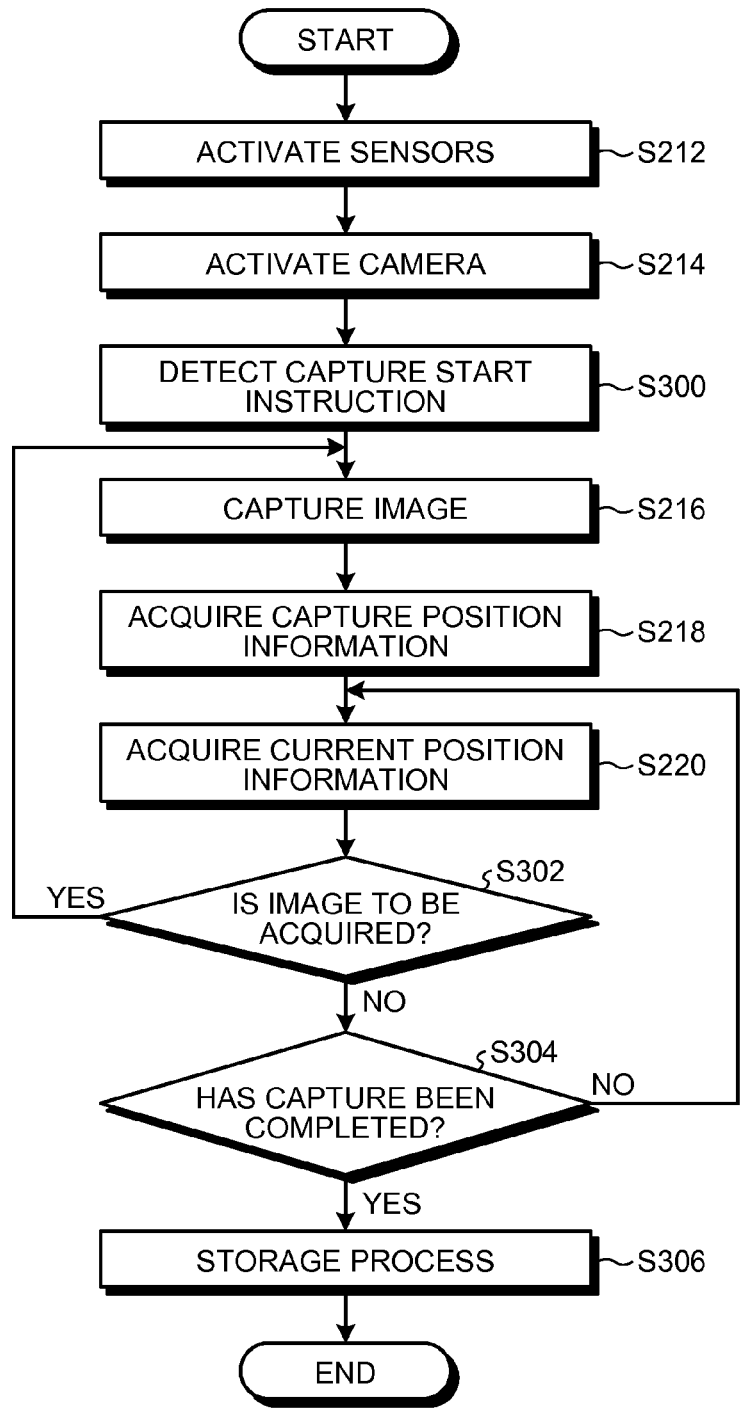
FIG. 28 is a flowchart illustrating an example of processes during the capture operation of the mobile phone.

The above case will be explained below with reference to FIG. 28. FIG. 28 is a flowchart illustrating an example of processes during the capture operation of the mobile phone. The processing procedure illustrated in FIG. 28 is also executed, similarly to the processing procedure illustrated in FIG. 25, based on the functions provided by the camera program 9C, the position detection program 9D, and the 3D image processing program 9E. Among the processes illustrated in FIG. 28, the same step numbers are assigned to the same processes as these of FIG. 25.

The mobile phone 1 activates the sensors at Step S212. Specifically, the mobile phone 1 activates the acceleration sensor 18 and the geomagnetic sensor 19. When the sensors are activated at Step S212, then at Step S214, the mobile phone 1 activates the camera 16.

When the camera 16 is activated at Step S214, then at Step S300, the mobile phone 1 detects a capture start instruction. Specifically, the mobile phone 1 detects pressing of a capture start instruction (shutter) by the user or the like.

When detecting a capture start instruction at Step S300, then at Step S216, the mobile phone 1 captures an image. That is, the mobile phone 1 acquires an image. The mobile phone 1 temporarily stores the data for the acquired image in the RAM 11, the storage unit 9, or the like. When the image is acquired at Step S216, then at Step S218, the mobile phone 1 acquires capture position information, i.e., information for a relative positional relation (relative position). The mobile phone 1 sets an initially detected relative position as a reference for a relative position. The mobile phone 1 temporarily stores the acquired capture position information.

When the capture position information is acquired at Step S218, then at Step S220, the mobile phone 1 acquires current position information. Specifically, the mobile phone 1 acquires information for a current relative position based on the information acquired from the sensors in the same manner as that at Step S218.

When the current position information is acquired at Step S220, then at Step S302, the mobile phone 1 determines whether to acquire an image. As for criteria as to whether to acquire an image, various settings can be made. For example, a case, in which it is a position suitable for capturing an image for stereoscopic viewing by being displayed in combination with an already acquired image, may be set to capture the image, and a case, in which an angle formed by the mobile phone 1 and a fixed subject becomes a given angle with respect to the reference position, may be set to capture an image, and the like.

When it is determined that an image is to be acquired at Step S302 (Yes), the mobile phone 1 proceeds to Step S216. In this way, the mobile phone 1 captures an image and acquires capture position information each time it is determined that an image is to be captured. When it is determined that an image is not to be acquired at Step S302 (No), that is, that the mobile phone 1 is not in the position where an image is captured, then at Step S304, the mobile phone 1 determines whether the capture has been completed. As for criteria as to whether the capture has been completed, various settings can also be made. For example, a case, in which the relative position is moved by a set angle, may be set to determine that the capture has been completed, and a case, in which it is detected that an end instruction has been input by the user, may be set to determine that the capture has been completed.

When it is determined that the capture has not been completed at Step S304 (No), the mobile phone 1 proceeds to Step S220, acquires again current position information, and determines whether to capture an image. When it is determined that the capture has been completed at Step S304 (Yes), then at Step S306, the mobile phone 1 performs a storage process. Specifically, the mobile phone 1 stores the captured image(s) and position information thereof in the image folder 9G of the storage unit 9. The mobile phone 1 may display the captured image and an inquiry screen as to whether to store the captured image on the touch panel 2, and store the image when detecting a storage instruction from the user. After the storage process at Step S306, the mobile phone 1 ends the present process.

In this way, the mobile phone 1 continuously captures images and further associates image data with their capture position information (relative position), and can thereby capture a plurality of images at different angles. This enables to capture image data capable of displaying three-dimensional images when one subject is viewed from a plurality of different angles. By associating relative position information with each of the image data to be stored, a three-dimensional image can be formed by combining appropriate images at each angle of relative positions.

By continuously capturing images, any combination of image data capable of displaying a three-dimensional image in any direction of the whole circumference (360 degrees) of the subject can be captured.

In the embodiment illustrated in FIG. 23 to FIG. 27, images are captured as still images; however, images may be captured as moving images. In other words, images of all acquired frames may be stored. In this case, respective relative position information is associated with each of the frames of the images as the captured moving images to be stored. In this way, by storing all the acquired frames, three-dimensional images can be displayed in more combinations of the frames, which enables a display of three-dimensional images at more precise angles.

Figure 29:
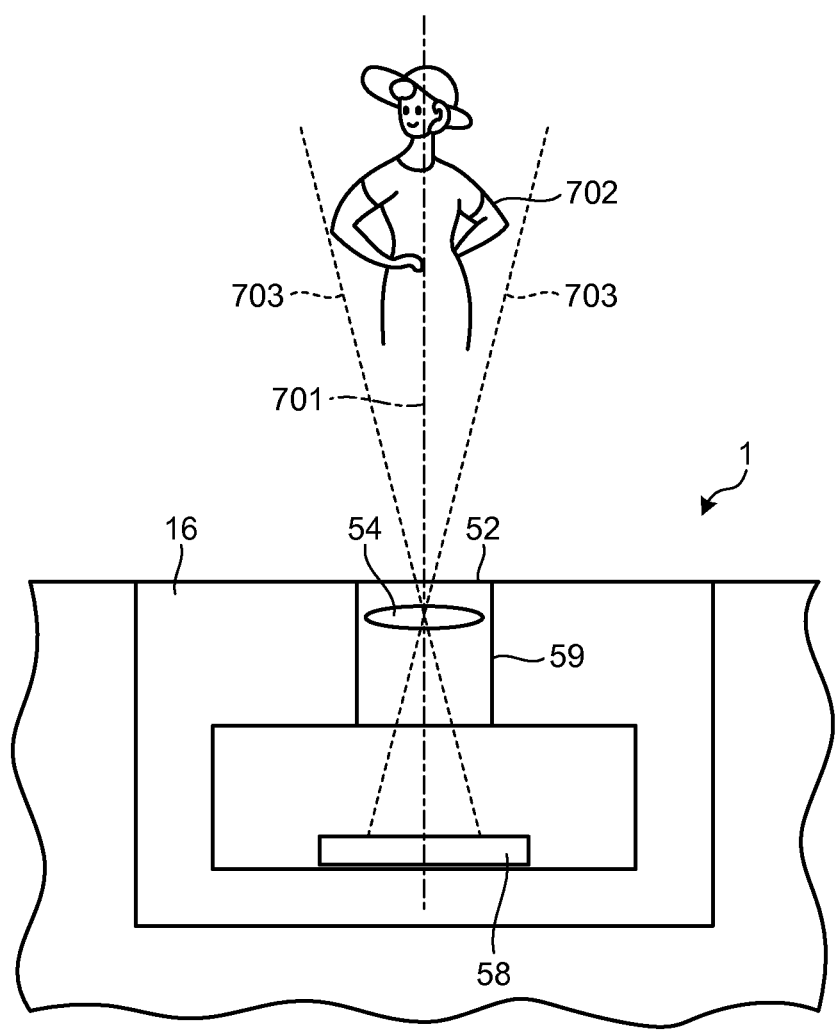
FIG. 29 is an explanatory diagram for explaining a capture operation of the mobile phone.
Figure 30:
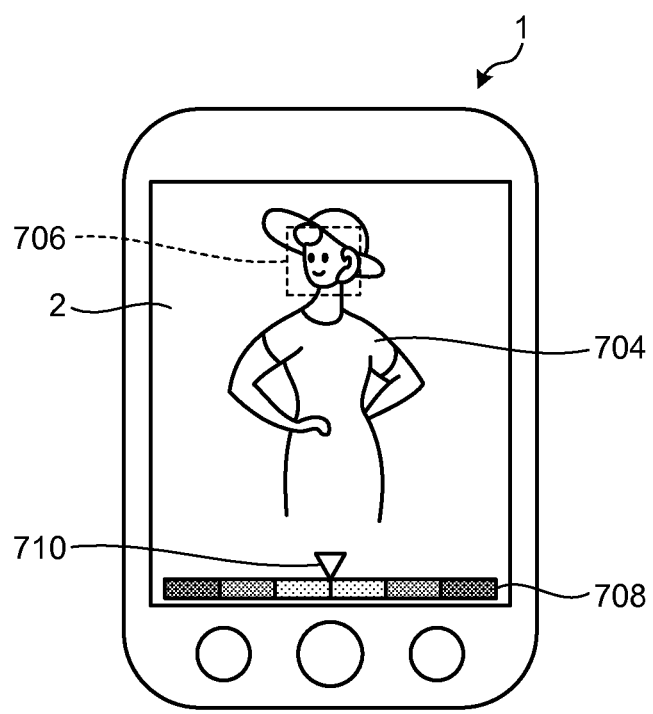
FIG. 30 is an explanatory diagram illustrating an example of a screen displayed during the capture operation of the mobile phone.
Figure 31:
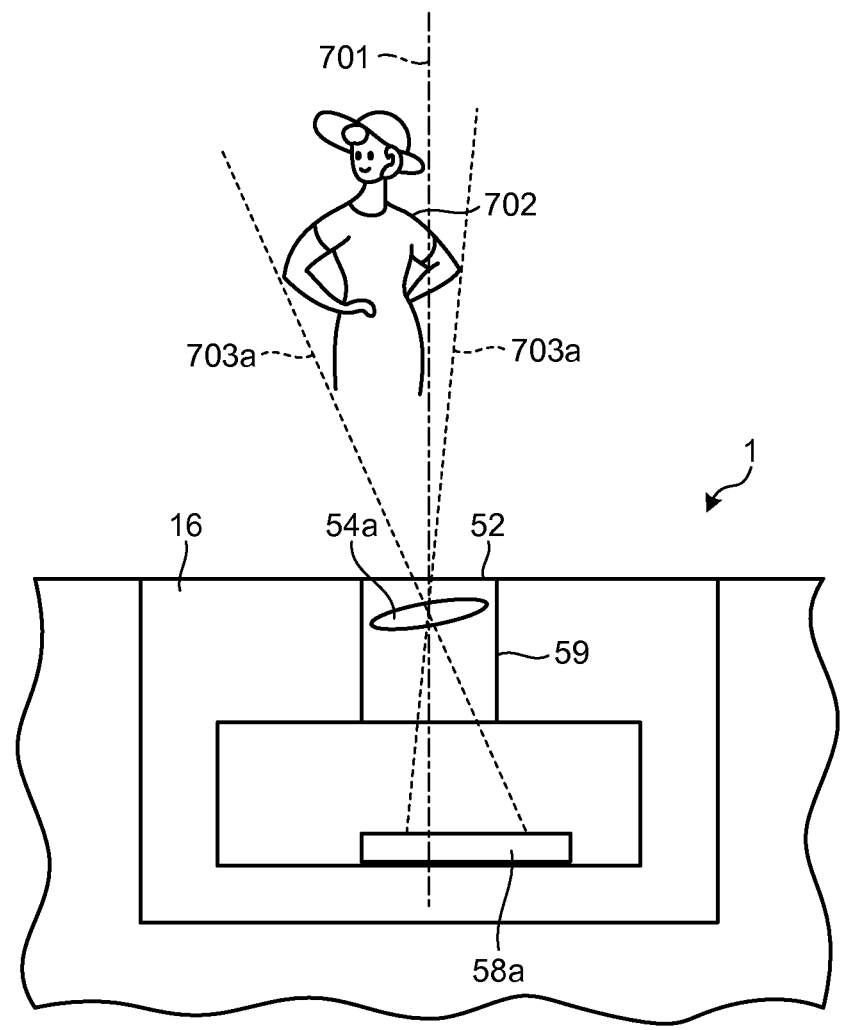
FIG. 31 is an explanatory diagram for explaining a capture operation of the mobile phone.
Figure 32:
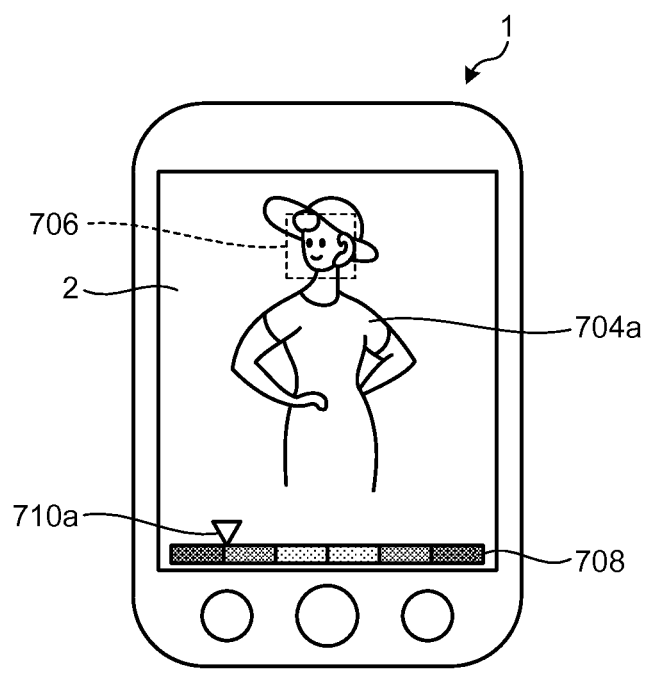
FIG. 32 is an explanatory diagram illustrating an example of a screen displayed during the capture operation of the mobile phone.

A preferred example of a capture operation will be explained below with reference to FIG. 29 to FIG. 32. FIG. 29 is an explanatory diagram for explaining a capture operation of the mobile phone. FIG. 30 is an explanatory diagram illustrating an example of a screen displayed during the capture operation of the mobile phone. FIG. 31 is an explanatory diagram for explaining a capture operation of the mobile phone. FIG. 32 is an explanatory diagram illustrating an example of a screen displayed during the capture operation of the mobile phone. The mobile phone 1 preferably detects the position of a subject and adjusts the capture area when an image is captured. Specifically, the mobile phone 1 preferably analyzes an image to determine the position of the subject within the image and adjusts the direction of the camera (angle of the capture area) to the direction in which the subject can be captured.

For example, as illustrated in FIG. 29, when a subject 702 is in the front of the mobile phone 1, i.e., a subject 702 is in a position where it overlaps a central line 701, the camera 16 captures an image as it is without moving a capture area 703. When the image is acquired in the state illustrated in FIG. 29, as illustrated in FIG. 30, an image in which a subject 704 is positioned at its center is displayed on the touch panel 2 of the mobile phone 1. In other words, an image in which the subject 704 is positioned at its center can be captured. The mobile phone 1 performs image processing to extract a position of a face 706 of the subject 704, so that the position of the subject 704 can be determined. Displayed on the touch panel 2 are a bar 708 as an indication indicating a range of an adjustable capture angle of the camera 16 and a mark 710 as an indication indicating a position, in the range, where the image has been captured. As illustrated in FIG. 30, the capture area 703 is not moved, and therefore the mark 710 is displayed in a state of pointing to the center of the bar 708.

Then as illustrated in FIG. 31, when the subject 702 is not in the front of the mobile phone 1, i.e., when the subject 702 is not in a position where it overlaps the central line 701, the camera 16 moves a capture area 703*a* according to the position of the subject 702 and captures an image. As illustrated in FIG. 31, the capture area 703*a* is moved to the left in the figure by a predetermined angle. Specifically, the capture-angle adjustment mechanism 59 adjusts the optical system 54*a* and the light-receiving unit 58*a* to the positional relation so that the capture area 703*a* can be captured. When the image is acquired in the state illustrated in FIG. 31, as illustrated in FIG. 32, an image in which a subject 704*a* is placed at its center is displayed on the touch panel 2 of the mobile phone 1. In this way, the portions are moved by the capture-angle adjustment mechanism 59 so as to obtain the capture area 703*a*, and an image in which the subject 704*a* is positioned at its center can thereby be captured. Displayed on the touch panel 2 are the bar 708 as the indication indicating the range of the adjustable capture angle of the camera 16 and a mark 710*a* as an indication indicating a position, in the range, where the image has been captured. As illustrated in FIG. 32, the capture area 703 is moved, and therefore the mark 710*a* is displayed at a position on the left side of the center of the bar 708.

In this way, by adjusting the capture area according to the position of the subject, an image in which the subject is placed at the center of the image can be captured even if the relative position is moved and the subject is not on the central line 701. This enables to prevent such a situation that no subject is included in an image and a three-dimensional image of the subject cannot thereby be created.

By displaying a relation between an adjustment range of the capture area and a current capture area on the screen, the user can be notified of a displacement between the central line and the subject. Thus, the subject can be held within an adjustable range.

In the embodiment illustrated in FIG. 29 to FIG. 32, the position of the subject is determined using face recognition; however, the embodiment is not limited thereto. For example, a displacement of a relative position may be detected based on a difference between the image and the previous image. Alternatively, the subject may be identified by recognizing the position specified by the user as a position of the subject and identifying the shape of the image at the position.

In the embodiment illustrated in FIG. 29 to FIG. 32, the capture area of the camera 16 is mechanically adjusted and the subject is adjusted so as to be at the center of the image (predetermined range); however, the embodiment is not limited thereto. The mobile phone 1 may preset only part of the capture area as an acquisition area of an image, that is, acquire a trimmed image, and change a position where the image is trimmed according to the displacement of the relative position. By using this method, the subject can also be held at a predetermined position of the image.

It is preferable that the mobile phone 1 executes the processes of the camera program 9C in the main control unit 10 to control capture conditions such as focal distance, magnification (zoom), and exposure and to set the brightness, the size, and the like of subjects in the captured images to be equal to each other. This enables to suppress the sense of incongruity caused by superimposing the images in order to display a three-dimensional image.

The mobile phone 1 may acquire position information by providing therein a GPS device (GPS position acquiring unit) to use GPS (Global Positioning System) and may acquire position information by acquiring a direction of the housing 12 using the geomagnetic sensor. In other words, a combination of the GPS device and the geomagnetic sensor can also be used as the relative-position acquiring unit. In this case, the mobile phone 1 detects an absolute position of the mobile phone 1 using the GPS device and detects the direction of the housing 12 using the geomagnetic sensor, and can thereby detect a relative position. For a distance between the housing 12 and the subject (distance to the subject), a predetermined value may be preset, or a distance may be input by the user based on an actual distance.

Figure 33:
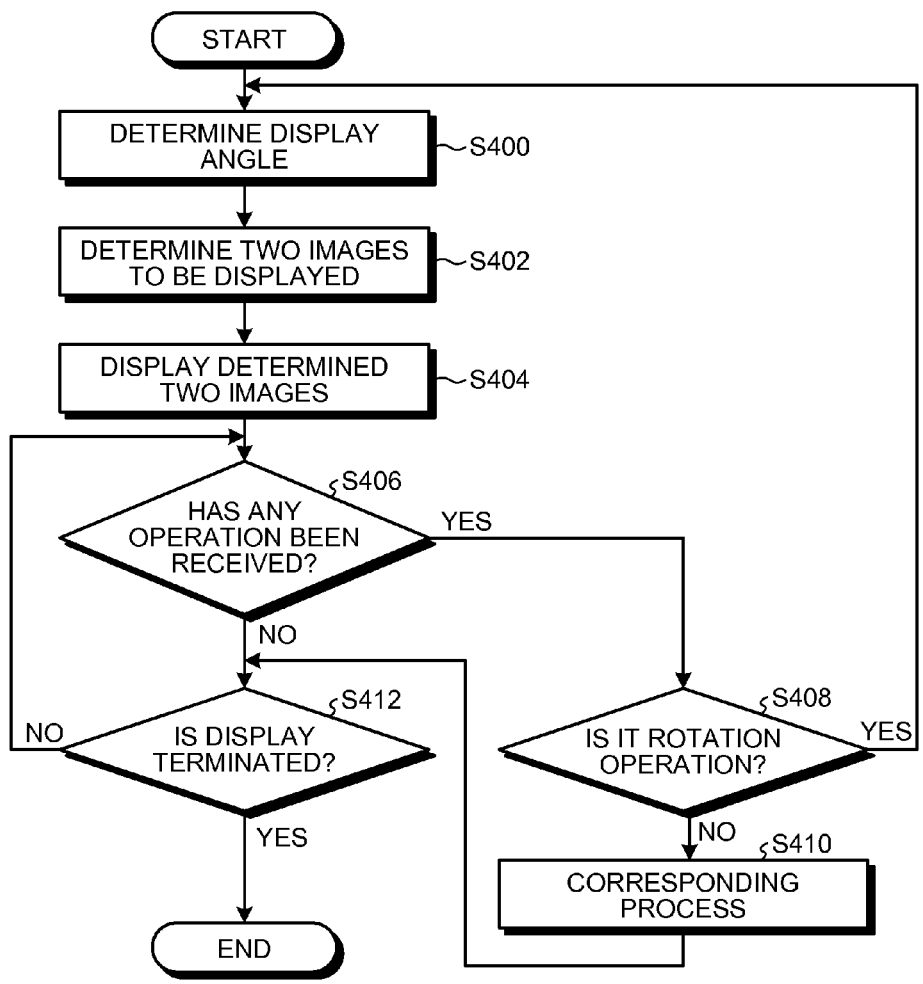
FIG. 33 is a flowchart illustrating an example of processes during a display operation of the mobile phone.
Figure 34:
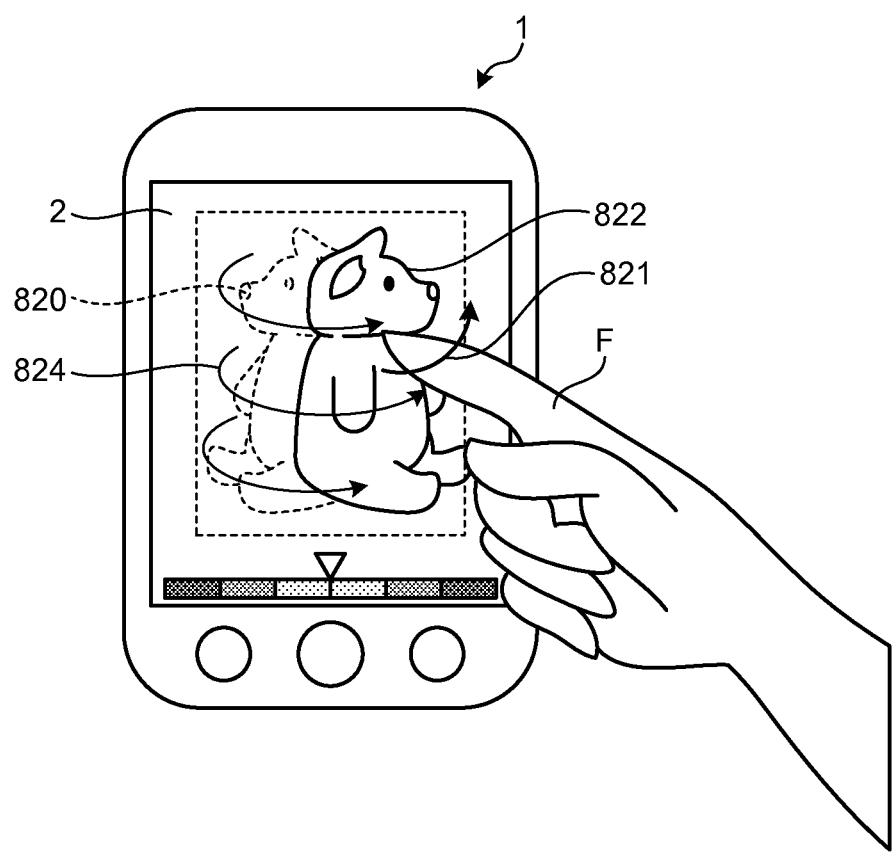
FIG. 34 is an explanatory diagram for explaining the display operation of the mobile phone.

Then an example of operations for three-dimensionally displaying the captured image will be explained below with reference to FIG. 33 and FIG. 34. FIG. 33 is a flowchart illustrating an example of processes during a display operation of the mobile phone. FIG. 34 is an explanatory diagram for explaining the display operation of the mobile phone. The processes illustrated in FIG. 33 are an example of the display operation of the mobile phone 1 for displaying a three-dimensional image. The processing procedure illustrated in FIG. 33 is executed based on the function provided by the 3D image processing program 9E.

First of all, when an instruction to display a three-dimensional image is received and a subject (image folder) as a target to be displayed is specified, the mobile phone 1 determines a display angle at Step S400. That is, the mobile phone 1 determines a display angle of a subject as a display target. The display angle is determined based on a user operation or preset conditions.

When the display angle is determined at Step S400, then at Step S402, the mobile phone 1 determines two images to be displayed. That is, the mobile phone 1 determines a combination of images capable of displaying a three-dimensional image of the subject based on coordinate information (information for a relative position) stored with the determined display angle in the image folder 9G. When two images are determined at Step S402, then at Step S404, the mobile phone 1 displays the determined two images on the touch panel 2. Specifically, the two images are displayed in a superimposed manner to display a three-dimensional image of the subject.

When the three-dimensional image is displayed at Step S404, then at Step S406, the mobile phone 1 determines whether any operation has been received. When it is determined that the operation has been received at Step S406 (Yes), then at Step S408, the mobile phone 1 determines whether the operation is a rotation operation. That is, the mobile phone 1 determines whether it is an operation of changing the display angle of the subject.

When it is determined that the operation is a rotation operation at Step S408 (Yes), the mobile phone 1 proceeds to Step S400. In this way, when receiving the operation of changing the display angle, the mobile phone 1 again determines a display angle based on the operation and displays a three-dimensional image of the subject at the angle.

When it is determined that it is not a rotation operation at Step S408 (No), then at Step S410, the mobile phone 1 performs a corresponding operation. That is, the mobile phone 1 executes a process corresponding to the received operation. After the performance of the process at Step S410, the mobile phone 1 proceeds to Step S412.

When it is determined that no operation has been received at Step S406 (No) or when the process at Step S410 has been performed, then at Step S412, the mobile phone 1 determines whether the display is terminated. That is, the mobile phone 1 determines whether the display of the three-dimensional image is terminated. When it is determined that the display is not terminated at Step S412 (No), the mobile phone 1 proceeds to Step S406, again determines whether the operation has been received, and repeats the processes. When it is determined that the display is terminated at Step S412 (Yes), then the mobile phone 1 terminates the display of the three-dimensional image and ends the present process.

A specific example will be explained below with reference to FIG. 34. As illustrated in FIG. 34, when an operation indicated by an arrow 821 is input with a finger F while displaying a three-dimensional image 820 representing the subject at a predetermined angle on the touch panel 2, the mobile phone 1 determines that an operation of rotating the subject has been input. The mobile phone 1 calculates an amount of rotation of the subject based on the operation input with the finger F and determines an angle at which the subject is to be displayed. Thereafter, the mobile phone 1 determines a combination of images capable of displaying the three-dimensional image at the determined angle, and displays the determined combination of images on the touch panel 2. This allows the mobile phone 1 to display a three-dimensional image 822, on the touch panel 2, in a state in which the subject has been rotated by a given angle from the image 820 in a direction of an arrow 824.

In this way, the mobile phone 1 stores therein a plurality pieces of image data obtained by capturing one subject at different relative positions and coordinate information for the image data, determines two image data from among the image data based on the determined display angle and the coordinate information of the image data, and displays the determined two image data in a superimposed manner, so that a three-dimensional image with the subject displayed at an arbitrary angle can be displayed.

Thus, three-dimensional images of the subject at various angles can be displayed and the shape of the subject can be more adequately recognized. In addition, the three-dimensional images can be displayed only by selecting actual images, and therefore there is no need to analyze complicated three-dimensional shape data or so, which enables three-dimensional images to be displayed by simple control. Moreover, by using actually captured images, a three-dimensional image with less sense of incongruity can be displayed.

FIG. 33 and FIG. 34 represent a display method when combinations of image data capable of displaying three-dimensional images of one subject at a plurality of angles are stored. If there is one combination of images, the combination of the images has only to be displayed on the touch panel 2. In the embodiment, the two images are combined to display a three-dimensional image; however, the embodiment is not limited thereto, and three or more images may be combined to display a three-dimensional image. In this way, by combining (superimposing) three or more images to be displayed, it is also possible to display an image that appears in a different state each time an angle of viewing the touch panel 2 is changed.

The image data to be displayed is not limited to image data captured by the mobile phone 1 itself, and therefore it may be configured to acquire, from an external device, a combination of a plurality of pieces of image data obtained by capturing one subject at different angles with coordinate information for the image data, and use the acquired data to display a three-dimensional image of the subject. In the present embodiment, a plurality of pieces of image data for one subject are stored in the image folder 9G; however, the embodiment is not limited thereto. Therefore, image data and coordinate information may be acquired from an external storage device through communication or the like. In this case, also, the data is processed while being temporarily stored in RAM or so.

Because the embodiment illustrated in FIG. 23 to FIG. 34 can be implemented with an existing device configuration and the device configuration can be easily made, a distance between the housing 12 and the subject is detected by using a focal distance calculated by an autofocus mechanism (aperture control function) of the camera 16; however, the embodiment is not limited thereto. Therefore, various functions for calculating a distance to the subject can be used. For example, various distance calculating units for calculating a distance to an object, such as an infrared sensor and an ultrasonic sensor, can be used.

In the embodiment illustrated in FIG. 23 to FIG. 34, the example of applying the present disclosure to the electronic device with the touch panel as a display unit has been explained; however, the present disclosure is also applicable to an electronic device with a simple display panel, as a display unit, on which a touch sensor is not overlaid.

In the embodiment illustrated in FIG. 23 to FIG. 34, the mobile phone has been explained as the one including both the function of capturing a three-dimensional image and the function of displaying the three-dimensional image; however, the embodiment is not limited thereto. The present disclosure is applicable in various ways to any electronic device if it has at least one of the function of capturing a three-dimensional image according to the embodiment and the function of displaying a three-dimensional image.

The invention claimed is:

1. An electronic device, comprising:
an imaging unit for capturing a subject; and
a storage unit for storing therein an image captured by the imaging unit, wherein the image stored in the storage unit is an image that forms a three-dimensional image when displayed in combination with another image of the same subject stored in the storage unit;
an angle detecting unit for detecting a relative rotation angle of the subject with respect to the imaging unit; and
a shape detecting unit for detecting a shape of the subject, wherein
the angle detecting unit is configured to detect the rotation angle of the subject based on a change in the shape of the subject detected by the shape detecting unit, and
the storage unit is configured to further store therein the rotation angle of the subject detected, upon capturing the image, by the angle detecting unit.

2. The electronic device according to claim 1, wherein the angle detecting unit is configured to
analyze the image acquired by the imaging unit,
detect a position of an angle specifying portion that relatively rotates together with the subject, and
detect thereby the relative rotation angle of the subject.

3. The electronic device according to claim 2, wherein the angle detecting unit is configured to
analyze the image acquired by the imaging unit,
detect a feature point of the subject, and
determine the feature point as the angle specifying portion.

4. The electronic device according to claim 1, wherein the angle detecting unit is configured to
acquire angle information for a supporting base for supporting the subject, and
detect a change in the rotation angle of the subject based on the angle information for the supporting base.

5. The electronic device according to claim 1, further comprising
a distance calculating unit for calculating a distance between the electronic device and the subject, wherein
the storage unit is configured to store therein the distance calculated by the distance calculating unit and the rotation angle detected by the angle detecting unit in association with each other.

6. The electronic device according to claim 5, wherein the distance calculating unit is configured to calculate the distance to the subject based on a focal distance detected by the imaging unit.

7. The electronic device according to claim 1, wherein the imaging unit is configured to capture the image when the angle detecting unit detects a rotation of the subject.

8. The electronic device according to claim 1, wherein the imaging unit continuously captures images.

9. The electronic device according to claim 1, wherein the imaging unit is configured to capture the image when it is determined, based on the rotation angle of the subject detected by the angle detecting unit and the rotation angle of the subject associated with an already captured image, that the subject is arranged in a position where an image that can be three-dimensionally displayed by being displayed in combination with the already captured image can be captured.

10. The electronic device according to claim 1, wherein the imaging unit is configured to capture the subject at a plurality of different rotation angles so as to obtain a combination of images for three-dimensionally displaying the subject.

11. The electronic device according to claim 1, further comprising:
a display unit for displaying the three-dimensional image based on a plurality of images; and
an operating unit for accepting an operation indicating that the three-dimensional image viewed from which rotation angle is displayed, wherein
the display unit is configured to use data for at least the two images to display the subject as the three-dimensional image, based on the operation detected by the operating unit and the angle information associated with the data for the images.

* * * * *